United States Patent
Schlenoff et al.

(10) Patent No.: US 10,919,032 B2
(45) Date of Patent: Feb. 16, 2021

(54) ANTIFOULING COMPOSITIONS AND METHODS

(71) Applicant: Florida State University Research Foundation, Inc., Tallahassee, FL (US)

(72) Inventors: Joseph Schlenoff, Tallahassee, FL (US); Yara Ghoussoub, Tallahassee, FL (US)

(73) Assignee: Florida State University Research Foundation, Inc., Tallahassee, FL (US)

(*) Notice: Subject to any disclaimer, the term of this patent is extended or adjusted under 35 U.S.C. 154(b) by 112 days.

(21) Appl. No.: 16/252,614

(22) Filed: Jan. 19, 2019

(65) Prior Publication Data

US 2019/0224664 A1 Jul. 25, 2019

Related U.S. Application Data

(60) Provisional application No. 62/619,697, filed on Jan. 19, 2018, provisional application No. 62/633,286, filed on Feb. 21, 2018.

(51) Int. Cl.

| | | |
|---|---|---|
| *B01J 47/014* | (2017.01) | |
| *B01J 41/14* | (2006.01) | |
| *C02F 1/42* | (2006.01) | |
| *B01J 41/07* | (2017.01) | |
| *B01J 39/05* | (2017.01) | |
| *B01J 41/05* | (2017.01) | |
| *B01J 39/07* | (2017.01) | |
| *B01J 43/00* | (2006.01) | |
| *B01J 47/016* | (2017.01) | |
| *C02F 101/30* | (2006.01) | |

(52) U.S. Cl.
CPC .............. *B01J 47/014* (2017.01); *B01J 39/05* (2017.01); *B01J 39/07* (2017.01); *B01J 41/05* (2017.01); *B01J 41/07* (2017.01); *B01J 41/14* (2013.01); *B01J 43/00* (2013.01); *B01J 47/016* (2017.01); *C02F 1/42* (2013.01); *C02F 2001/422* (2013.01); *C02F 2101/30* (2013.01)

(58) Field of Classification Search
CPC ........ B01J 47/014; B01J 47/016; B01J 41/14; B01J 41/07; B01J 41/05; B01J 39/05; B01J 39/07; B01J 43/00; C02F 1/42; C02F 2101/30; C02F 2001/422
USPC .......................................................... 521/28
See application file for complete search history.

(56) References Cited

PUBLICATIONS

Wang et al. "Improved antifouling properties of membranes by simple introduction of zwitterionic copolymers via electrostatic adsorption", Journal of Membrane Science, 564 (2018) pp. 672-681 (Year 2018).*
Ghoussoub et al. "Antifouling Ion-Exchange Resins", ACS Appl. Mater. Interfaces, 2018, 10, pp. 41747-41756 (Year 2018).*
Mulyati et al. "Simultaneous improvement of the monovalent anion selectivity and antifouling properties of an anion exchange membrane in an electrodialysis process, using polyelectrolyte multilayer deposition", Journal of Membrane Science 431 (2013), pp. 113-120. (Year: 2013).*
Ma et al. "Controlling biofouling of reverse osmosis membranes through surface modification via grafting patterned polymer brushes", Journal of Water Reuse and Desalination, 05.3 (2015), pp. 326-334. (Year: 2015).*
Ji etal. "Bio-inspired fabrication of high perm-selectivity and antifouling membranes based on zwitterionic polyelectrolyte nanoparticles", J. Mater. Chem. A, 2016, 4, pp. 4224-4231. (Year: 2016).*
Xiang etal. "Zwitterionic polymer functionalization of polysulfone membrane withimproved antifouling property and blood compatibility by combination of ATRP and click chemistry", Acta Biomaterialia 40 (2016), pp. 162-171. (Year: 2016).*
Callow et al., "Trends in the Development of Environmentally Friendly Fouling-Resistant Marine Coatings," Nature Communication, 2011 (10 pages).
Dai et al., "Controlling the Permeability of Multilayered Polyelectrolyte Films Tbhrough Derivatization, Cross-Linking, and Hydrolysis," Langmuir, 2001, 17:931-937.
Gonder et al., "Capacity Loss in an Organically Fouled Anion Exchanger," Desalination, 2006, 189:303-307.
Kozlovskaya et al., "Hydrogen-Bonded Polymer Capsules Formed by Layer-by-Layer Self-Assembly," Macromolecules, 2003, 36:8590-8592.
Smets, "Photocross-Linkable Polymers," J. Macromol. Sci.-Chem., 1984, A21 (13 & 14):1695-1703.
Walker et al., "Long-Term Performance of Bicarbonate-Form Anion Exchange: Removqal of Dissolved Organic Matre and Bromide from the St. Johns River, FL, USA," Water Research, 2011, 45:2875-2886.
Zhang et al., "Chemical Cleaning of Fouled PVC Membrane During Ultrafiltration of Algal-Rich Water," Journal of Environmental Sciences, 2011, 23(4):529-536.

\* cited by examiner

*Primary Examiner* — Michael Bernshteyn

(74) *Attorney, Agent, or Firm* — Eversheds Sutherland (US) LLP

(57) ABSTRACT

Compositions that include an ion exchange resin and a polyelectrolyte. The polyelectrolyte may be adsorbed to at least a portion of a surface of the ion exchange resin. Methods of treating a liquid with a composition, and methods of forming a composition that includes an ion exchange resin and a polyelectrolyte.

20 Claims, 14 Drawing Sheets

ANTIFOULING COMPOSITIONS AND METHODS

CROSS-REFERENCE TO RELATED APPLICATIONS

This application claims priority to U.S. Provisional Patent Application No. 62/619,697, filed Jan. 19, 2018, and U.S. Provisional Patent Application No. 62/633,286, filed Feb. 21, 2018, which are both incorporated herein by reference.

STATEMENT REGARDING FEDERALLY SPONSORED RESEARCH AND DEVELOPMENT

This invention was made with government support under DMR 1506824 awarded by the National Science Foundation. The government has certain rights in the invention.

BACKGROUND

Ion exchange resins (IERs) and membranes are widely used in a number of applications, including water treatment and other processes. Anion exchange resins (AER), for example, may be employed for the removal of natural organic matter (NOM), which typically is mostly anionic.

However, the use of AERs has been limited, at least in part, by fouling. Typically, fouling is caused at least in part by one or more organic substances, such as humic acid and/or fulvic acid (see, e.g., Gonder, Z. B. et al., *Desalination* 2006, 189, 303-307). Resin fouling has been reported to cause at least one of capacity loss and performance loss, especially during repeated uses in cyclic and long-term operations. The performance of resins after several regenerations has been reported to experience an appreciable decline (see, e.g., Walker, et. al., *Water Research* 2011, 45, 2875-2886).

IERs, in some instances, are submerged in water continuously or for long periods, and, as a result, are subjected to settlement of marine organisms, such as algal cells. NOM in raw waters can include algal cells and algae-derived precursors, which can cause water contamination by the formation of disinfection byproducts (DBPs). Algogenic organic matter (AOM) can constitute a major foulant of microfiltration and ultrafiltration membranes used in the treatment of drinking water (see, e.g., Zhang, Y. et al., *Journal of Environmental Sciences* 2011, 23, 529-536).

Resins also can be used for water softening, demineralization, etc. In these applications, the adsorption of pollutants and/or organic substances typically has an undesirable effect on the performance of the deionizer.

Earlier techniques usually relied on biocide-based systems, which usually resulted in one or more adverse consequences, and typically posed one or more environmental concerns. Several alternative strategies have been developed recently to control the undesired settlement and growth of algal cells (see, e.g., Callow, J. A. et al., *Nature Communications* 2011, 2).

There remains a need for compositions that are less susceptible or not susceptible to fouling, and methods that reduce the fouling of ion exchange resins or render them nonfouling. For example, there remains a need to reduce the fouling of, or render nonfouling, anion exchange resins. There also remains a need for reducing or eliminating fouling in a way that does not undesirably impact one or more aspects of the performance of an ion exchange resin, such as the ion exchange capacity of a resin.

BRIEF SUMMARY

Provided herein are compositions, including ion exchange resins, that are less susceptible or not susceptible to fouling. Also provided herein are methods of treating (e.g., purifying) one or more materials, such as water.

In one aspect, compositions are provided that include an ion exchange resin and a polyelectrolyte. In some embodiments, the compositions include an ion exchange resin and a polyelectrolyte, wherein the polyelectrolyte is adsorbed to at least a portion of a surface of the ion exchange resin. In some embodiments, the compositions include an ion exchange resin and a polyelectrolyte, wherein the polyelectrolyte (i) is adsorbed to at least a portion of a surface of the ion exchange resin, (ii) includes at least one aromatic sulfonated repeat unit and at least one zwitterionic repeat unit, and (iii) has a weight average molecular weight of about 100,000 g/mole to about 1,000,000 g/mole.

In another aspect, methods of treating a liquid are provided. In some embodiments, the methods include contacting a liquid with a composition described herein. The liquid may include water.

In another aspect, methods for making a composition are provided. In some embodiments, the methods include providing a first mixture including a polyelectrolyte and a liquid; and contacting an ion exchange resin with the first mixture for a time effective to adsorb at least a portion of the polyelectrolyte to at least a portion of a surface of the ion exchange resin to form the composition.

Additional aspects will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1A:
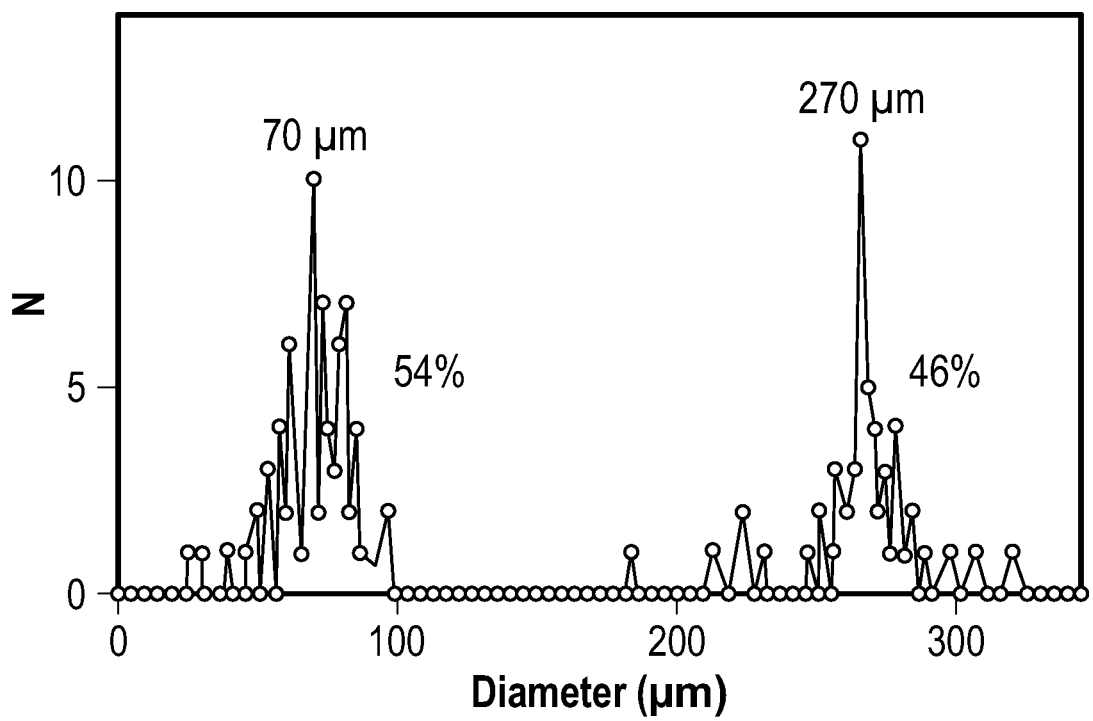
FIG. 1A depicts a size distribution plot of one embodiment of an ion exchange resin.

Provided herein are compositions that may include an ion exchange resin and a polyelectrolyte. In some embodiments, the polyelectrolyte is adsorbed to at least a portion of a surface of the ion exchange resin.

In some embodiments, a polyelectrolyte is adsorbed only to at least a portion of a surface of the ion exchange resin, and, as a result, a bulk portion of an ion exchange resin may be substantially free of the polyelectrolyte. In some embodiments, a polyelectrolyte is adsorbed to at least a portion of a surface of the ion exchange resin and at least a portion of the bulk portion of the ion exchange resin.

As used herein, the phrase "bulk portion" refers to the internal portions of an ion exchange resin that are not visible (e.g., via SEM micrograph) when the ion exchange resin is viewed externally. The phrase "a surface of the ion exchange resin" refers to external portions of an ion exchange resin, which are those portions that are visible (e.g., via SEM micrograph) when the ion exchange resin is viewed externally. The surface of an ion exchange resin may include one or more substantially smooth areas, one or more non-smooth areas, or a combination thereof. The non-smooth areas may include any imperfection, including, but not limited, to depressions, ridges, etc.

Not wishing to be bound by any particular theory it is believed, at least in some embodiments, that a polyelectrolyte in the bulk portion of an ion exchange may occupy or restrict access to ion exchange sites, thereby possibly decreasing the capacity of the ion exchange resin, and/or may no longer confer antifouling properties to the surface of the ion exchange resin.

Not wishing to be bound by any particular theory, it is believed that one or more properties of a polyelectrolyte (e.g., the molecular weight of the polyelectrolyte, physical structure (e.g., degree of branching, etc.), etc.) may be selected to achieve adsorption of the polyelectrolyte to one or more desirable locations of an ion exchange resin. For example, a polyelectrolyte may have a molecular weight that exceeds a certain threshold in order to reduce or minimize the amount of the polyelectrolyte that is present in and/or adsorbs to a bulk portion of an ion exchange resin. As a further example, a molecular weight that exceeds a certain threshold may prevent a polyelectrolyte, such as a polyelectrolyte that includes sulfonated aromatic repeat units, from diffusing into a bulk portion of an ion exchange resin and adsorbing to the bulk portion of the ion exchange resin.

Polyelectrolyte

As used herein, the term "polyelectrolyte" refers to a polymer that includes one or more charged monomers (i.e., charged repeat units). The one or more charged monomers may bear a positive charge, a negative charge, or both a positive and a negative charge; or the polyelectrolyte may include one or more negatively charged monomers and one or more positively charged monomers. The polyelectrolytes herein also may include one or more neutral monomers. As used herein, the term "polymer" refers to and includes polymers, co-polymers, and oligomers. As used herein, the phrase "neutral monomers" refers to repeat units that do not include a net charge.

The polyelectrolyte may be an anionic polyelectrolyte that is natural or synthetic. In some embodiments, the compositions herein include an anionic polyelectrolyte and an anion exchange resin.

In some embodiments, the polyelectrolyte includes a sulfonated repeat unit (i.e., a sulfonated monomer). As used herein, the phrase "sulfonated repeat unit" generally refers to a repeat unit (i.e., monomer) that includes a sulfonate functional group ($-SO_3^-$). The sulfonated repeat unit may be present in a polyelectrolyte at a mole fraction of about 0.1 to about 1, about 0.2 to about 1, about 0.3 to about 1, about 0.4 to about 1, or about 0.5 to about 1.

In some embodiments, the polyelectrolyte includes a sulfonated repeat unit, and the sulfonated repeat unit is a sulfonated aromatic repeat unit. As used herein, the phrase "sulfonated aromatic repeat unit" generally refers to a repeat unit that includes an aromatic moiety that is substituted with at least one sulfonate functional group. In some embodiments, the areal density of coverage of the sulfonated aromatic repeat unit is less than 5 mg per square meter. In some embodiments, the sulfonated aromatic repeat unit has a molecular weight distribution less than 1.1.

Non-limiting examples of sulfonated aromatic repeat units are provided in the following table.

| Non-limiting Examples of Aromatic Sulfonate Polyelectrolyte Repeat Units (counter ions not shown) | |
|---|---|
| Name | Structure |
| Sulfonated polyalpha-methyl styrene | 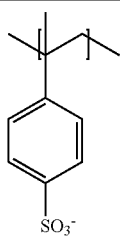 |
| styrene-sulfonate (PSS) | 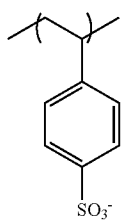 |

| Non-limiting Examples of Aromatic Sulfonate Polyelectrolyte Repeat Units (counter ions not shown) | |
|---|---|
| Name | Structure |
| Sulfonated polypropylene oxide | |
| Sulfonated polyetheretherketone (SPEEK) | |
| Sulfonated polyphenylene sulfide | |
| Sulfonated polyparaphenylene | |
| Sulfonated polysulfone | |

Non-limiting examples of polyelectrolytes having a sulfonated repeat unit include [1] poly(styrenesulfonic acid) (PSS) or a salt thereof, [2] poly(2-acrylamido-2-methyl-1-propane sulfonic acid) (PAMPS) or a salt thereof, [3] sulfonated poly(ether ketone) (SPEEK) or a salt thereof, [4] poly(ethylenesulfonic acid) or a salt thereof, [5] poly(methacryloxyethylsulfonic acid) or a salt thereof, or [6] a copolymer thereof. The polyelectrolytes that include a sulfonated aromatic repeat unit may include rigid rod backbones, such as aromatic backbones, or partially aromatic backbones, including sulfonated polyparaphenylene, sulfonated polyetherether ketones (SPEEK), sulfonated polysulfones, sulfonated polyarylenes, and sulfonated polyarylene sulfones.

In some embodiments, the polyelectrolyte includes a charged biomacromolecule. As used herein, the phrase "charged biomacromolecule" generally refers to [1] naturally occurring polyelectrolytes, or [2] synthetically modified charged derivatives of naturally occurring biomacromolecules, such as modified celluloses, chitosan, guar gum, or a combination thereof.

In some embodiments, the charged biomacromolecules include a sulfonate functional group in their repeat units. Non-limiting examples of such charged biomacromolecules include chitosan sulfate, cellulose sulfate, dextran sulfate, sulfonated lignin, or a combination thereof. Not wishing to be bound by any particular theory, it is believed that charged biomacromolecules may be desirable, in some embodiments, because they may be inexpensive, widely available, nontoxic, or combination thereof.

In some embodiments, the polyelectrolyte includes [1] a polycarboxylate or a salt thereof, [2] a polyphosphate or a salt thereof, [3] a polyphosphonate or a salt thereof, or [4] a combination thereof.

A polyelectrolyte may include one or more zwitterionic repeat units. As used herein, the phrase "zwitterionic repeat unit" generally refers to repeat units that have at least one negative charge and at least one positive charge. The zwitterionic repeat units typically include an equal number of positive and negative charges.

In some embodiments, the polyelectrolyte includes one or more zwitterionic repeat units, and the one or more zwitterionic repeat units includes 3-[2-(acrylamido)-ethyldimethyl ammonio] propane sulfonate. In some embodiments, the polyelectrolyte includes one or more zwitterionic repeat units and one or more sulfonated repeat units. In some embodiments, the polyelectrolyte includes one or more zwitterionic repeat units and one or more sulfonated aromatic repeat units. In some embodiments, the polyelectrolyte includes a polymer of the following formula:

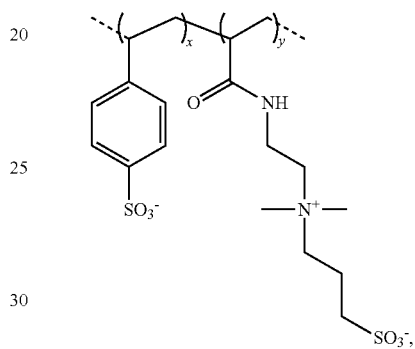

wherein x is a first mole fraction of about 0.5 to about 0.99, and y is a second mole fraction of about 0.01 to about 0.5.

Polyelectrolyte complexes that include zwitterions useful for preventing protein and/or cell adhesion have been described at U.S. Patent Application Publication No. 2005/00287111, which is incorporated herein by reference.

In some embodiments, the polyelectrolytes include one or more zwitterionic repeat units and one or more groups capable of intermolecular interactions, such as hydrogen bonding.

When a polyelectrolyte includes one or more zwitterionic repeat units, the zwitterionic repeat units may (i) be present as one or more blocks, or (ii) randomly dispersed throughout the polymer chain. In some embodiments, the polyelectrolytes include about 1 mol % to about 90 mol % zwitterionic units, or about 10 mol % to about 70 mol % zwitterionic units. In some embodiments, the polyelectrolytes include one or more zwitterionic repeat units, and about 10 mol % to about 90 mol % non-zwitterionic charged repeat units. The non-zwitterionic repeat units may include sulfonated aromatic repeat units. Examples of other suitable zwitterionic groups are disclosed by U.S. Patent Application Publication No. 2005/0287111, which is incorporated herein by reference.

In some embodiments, the polyelectrolyte is a synthetic polymer that includes pH sensitive repeat units, pH insensitive repeat units, or a combination thereof. As used herein, the phrase "pH insensitive repeat units" refers to repeat units that are configured to maintain substantially the same charge throughout a particular pH range. Not wishing to be bound by any particular theory, it is believed that a mixture of pH sensitive groups and pH insensitive groups may permit the pH insensitive groups to interact with oppositely-charged pH insensitive groups of some embodiments of an ion exchange resin, thereby facilitating or promoting the adsorbance of a polyelectrolyte to the ion exchange resin, including a surface of the ion exchange resin.

For example, poly(acrylic acids) and derivatives begin to take on a negative charge within a pH range of about 4 to about 6, and are negatively charged when a pH exceeds about 6. Below a pH of 4, however, poly(acrylic acids) are protonated (i.e., uncharged). As such, and in accordance with some embodiments, the pH of a liquid that includes a polyelectrolyte can be adjusted in order to attain, maintain, and/or adjust the electrical charge of a polyelectrolyte of the compositions described herein.

As used herein, the phrase "state of ionization" refers to the average charge per repeat unit or, in other words, the charge density. For example, if a random copolymer of styrene sulfonate (SS, negative) and acrylamide (AAc, neutral) is prepared with a composition of 70 SS units and 30 AAc units, the charge density is 0.70. As a further example, if a polyelectrolyte is a homopolymer wherein each repeat unit includes two sulfonates, then the charge density is 2.0. In some embodiments, a polyelectrolyte of the compositions described herein has a charge density of about 0.1 to about 2.0, about 0.1 to about 1.5, about 0.1 to about 1, about 0.3 to about 1, about 0.5 to about 1, or about 0.7 to about 1.

In some embodiments, the polyelectrolytes of the compositions described herein include neutral repeat units. The uncharged repeat unit may not be pH sensitive in an operating pH range, for example, a pH range of about 3 to about 9. In some embodiments, the uncharged repeat unit is hydrophilic, water-soluble, or a combination thereof. Non-limiting examples of uncharged hydrophilic repeat units include acrylamide, vinyl pyrrolidone, ethylene oxide, vinyl caprolactam, or a combination thereof, which are depicted in the following table. In some embodiments, the uncharged repeat includes N-isopropylacrylamide, propylene oxide, or a combination thereof.

| Non-limiting Examples of Neutral Repeat Units | |
|---|---|
| Name | Structure |
| Acrylamide | (structure) |
| Vinylpyrrolidone | (structure) |
| Ethylene oxide | (structure) |
| Vinylcaprolactam | (structure) |

In some embodiments, the polyelectrolyte has a weight average molecular weight ($M_w$) of about 1,000 g/mol to about 5,000,000 g/mol, about 10,000 g/mol to about 5,000,000 g/mol, about 10,000 g/mol to about 4,000,000 g/mol, about 10,000 g/mol to about 3,000,000 g/mol, about 10,000 g/mol to about 2,000,000 g/mol, about 10,000 g/mol to about 1,000,000 g/mol, or about 100,000 g/mol to about 1,000,000 g/mol. In some embodiments, the polyelectrolyte has a weight average molecule weight ($M_w$) of at least 100,000 g/mol. Not wishing to be bound by any particular theory, it is believed, at least in some embodiments, that a weight average molecular weight of at least 100,000 g/mol may prevent a polyelectrolyte from diffusing into a bulk portion of an ion exchange resin.

The polyelectrolytes herein may have a narrow molecular weight distribution. The phrase "molecular weight distribution", as used herein, refers to the polydispersity index, which is typically given as the ratio of the weight average molecular weight, $M_w$, to the number average molecular weight, $M_n$. As used herein, the phase "narrow molecular weight distribution" refers to a polydispersity of about 1 to about 1.1, or about 1.0001 to about 1.1.

The polyelectrolyte may have a linear structure. In some embodiments, the polyelectrolyte has a branched structure. Branching may occur at random or at regular locations along the backbone of a polyelectrolyte. Branching may also occur from a central point, and such a polyelectrolyte may be referred to as a "star" polyelectrolyte if substantially linear strands of the polyelectrolyte originate at the central point. When branching propagates at a location removed from the central point, then the polyelectrolyte may be referred to as a "dendritic" polyelectrolyte. Branched polyelectrolytes, including star polyelectrolytes, comb polyelectrolytes, graft polyelectrolytes, and dendritic polyelectrolytes, are used in some embodiments of the compositions and methods described herein. Block polyelectrolytes are also used in some embodiments of the compositions and methods described herein. The phrase "block polyelectrolytes" refers to those structures that include at least one block of charged repeat units. The number of blocks may be 2 to 5. In some embodiments, the number of blocks is 2. In some embodiments, the number of blocks is 3.

In some embodiments, the polyelectrolyte has a low toxicity or no toxicity. For example, PSS is approved by the FDA for use in the treatment of hyperkalemia.

In some embodiments, one or more structural features of the polyelectrolytes are selected or tailored in order to impart or modify one or more properties of the polyelectrolytes, such as charge density, viscosity, water solubility, response to pH, or a combination thereof. One or more of these properties may determine, at least in part, the portions of an ion exchange resin to which a polyelectrolyte adsorbs or is likely to adsorb.

Ion Exchange Resins (IERs)

Generally, any known ion exchange resin may be used in the compositions and methods described herein. As used herein, the phrase ion exchange resin generally refers to an insoluble crosslinked polymeric matrix that includes one or more charged functional groups.

Typically, the functional moieties in IERs are positively or negatively charged groups accompanied by small counterions. Generally, the IERs may be configured so that an exchange of ions can occur between the resin phase and a liquid phase when resin particles are contacted with a liquid containing an excess of ions of the same charge.

In view of the nature of the exchanged ions, IERs can be classified as anion exchange resins or cation exchange resins. Anion exchange resins are typically strongly or weakly basic, while cation exchange resins may be strongly or weakly acidic. The ion exchange can depend on one or more factors, including, but not limited to, the ion concentration in a liquid and the affinity of the ions to the resin.

The IERs which may be used in the compositions and methods described herein can have a wide range of applications in various processes, including, but not limited to, separation, purification, and decontamination (e.g. water softening, wastewater treatment), as well as a range of chromatographic techniques. Many of these processes may be dependent on the surface chemistry of a resin, and a polyelectrolyte, as described, may be selected in view of one or more properties of a resin.

In some embodiments, the ion exchange resins used herein are disposed at least partially about (e.g., around) a core material. For example, an ion exchange composition may include a magnetic core and an ion exchange resin disposed at least partially around the magnetic core. The magnetic core can allow the ion exchange resin to be collected with a magnet for treatment or disposal.

The ion exchange resins of the compositions and methods herein generally may be of any size and/or shape. For example, an ion exchange resin may be in the shape of particles (e.g., beads), a tube, a film, a membrane, etc. As used herein, the term "bead" generally refers to particles that are substantially spherical.

In some embodiments, the ion exchange resin is a bead-shaped ion exchange resin. The beads of the ion exchange resin may have an average diameter of about 10 micrometers to about 1 mm, as determined by dynamic light scattering.

In some embodiments, the ion exchange resin of the methods and compositions described herein includes a polystyrene matrix crosslinked with divinylbenzene.

In some embodiments, the ion exchange resin of the methods and compositions described herein is selected from those IERs used for extraction and concentration of dilute minerals or ions from aqueous suspensions, slurries, or solutions. Examples include the separation of uranium from plutonium, or the extraction of ions including uranium from more dilute solutions, as disclosed, for example, in U.S. Pat. No. 7,655,199 B2, which is incorporated herein by reference.

In some embodiments, the ion exchange resin of the methods and compositions described herein is selected from those used as membranes in electrodialysis for the purification of water, as disclosed, for example, in U.S. Pat. No. 2,784,158, which is incorporated herein by reference.

In some embodiments, an ion exchange resin of the methods and compositions described herein includes a polyelectrolyte chain crosslinked with one or more agents, such as divinylbenzene. The crosslinking may be performed as the IER, whether particle (e.g., bead), membrane, or other shape, is synthesized and/or formed.

For the industrial scale formation of IER beads, charged functionality is typically imparted to an ion exchange resin after a crosslinked polymer (e.g., polystyrene) has been formed. Thus, in accordance with some embodiments, the ion exchange resin is a cation exchange resin formed by exposing a crosslinked bead of an ion exchange resin to an agent that provides a negatively charged functional group, such as a carboxylate or sulfonate, on the bead, as disclosed, for example, in U.S. Pat. No. 4,209,592, which is incorporated herein by reference. In some embodiments, the ion exchange resin is an anion exchange resin that includes a bead that is chloromethylated, then quaternized with a tertiary amine, as described, for example, in U.S. Pat. No. 2,597,439, which is incorporated herein by reference.

Methods of Treating a Liquid

Methods of treating a liquid also are provided. In some embodiments, the methods include contacting a liquid with a composition described herein.

As used herein, the term "treating" generally refers to the removal or reduction of one or more materials from the liquid. Therefore, the terms "treating" and "purifying" are used interchangeably herein. The one or more materials may include one or more ions.

In some embodiments, the liquid includes water. In some embodiments, the liquid is an aqueous liquid. As used herein, the phrase "aqueous liquid" refers to those liquids that include water at an amount of at least 50% by weight.

In some embodiments, the liquid is contacted with a composition that is in the form of beads. The beads may be disposed in a column. The beads may have an average diameter of about 10 micrometers to about 1 mm, as determined by dynamic light scattering. For industrial or household water treatment, water may be passed through a column including beads of a composition described herein, wherein the beads have an average diameter of about 10 micrometers to 1 millimeter, as determined by dynamic light scattering. The ions that may be in the water, such as calcium, lead, cadmium, etc., may be exchanged with ions within the IER, thereby reducing the amount of or removing the ions from the water.

Methods of Making a Composition

Also provided herein are methods of making a composition. In some embodiments, the methods include providing a first mixture that includes a polyelectrolyte and a liquid; contacting an ion exchange resin with the first mixture for a time effective to adsorb at least a portion of the polyelectrolyte to at least a portion of a surface of the ion exchange resin to form the composition.

In some embodiments, the contacting of the ion exchange resin with the first mixture includes submerging, completely or partially, the ion exchange resin in the first mixture.

The polyelectrolyte may be present in the first mixture at any concentration. The time effective to adsorb at least a portion of the polyelectrolyte to at least a portion of a surface of an IER may be inversely related to the concentration of the polyelectrolyte of the first mixture. In some embodiments, the concentration of polyelectrolyte in the first mixture is about 1 micromolar to about 2 molar, or about 1 millimolar to about 0.1 molar. The molar concentrations are based on the molar concentration of the repeat unit(s) of the polyelectrolyte. For example, a solution of 20.7 g PSS (sodium salt) per liter is a PSS—Na concentration of 0.1 molar.

In some embodiments, the ion exchange resin is a particulate ion exchange resin (e.g., beads) and the contacting of the IER with the first mixture includes placing the IER into a column and then disposing the first mixture in the column. For example, the first mixture may be passed through the column in continuous or batch mode. The column optionally may be rinsed with fresh water or fresh salt solution, neither including a polyelectrolyte.

In some embodiments, the contacting of the IER with the first mixture includes stirring one or more batches of the IER in vessels with the first mixture. After removing substantially all of the first mixture, the IER batch may optionally be rinsed with fresh water or salt solution then dried.

In some embodiments, the contacting of the IER with the first mixture includes spraying the IER with the first mixture. For example, a moving bed of dispersed IER beads or an IER membrane may be sprayed with the first mixture by hydraulic or ultrasonic spraying using a static nozzle.

In some embodiments, the contacting of the IER with the first mixture includes passing an IER membrane through a bath of polyelectrolyte and/or a curtain of polyelectrolyte solution.

Generally, the contacting of an IER with a first mixture may be performed at any temperature that does not undesirably impact the methods described herein. The temperature at which the contacting occurs can affect the viscosity of the first mixture, the rate at which the polyelectrolyte adsorbs to the IER, or a combination thereof.

In some embodiments, a temperature is adjusted to improve the speed at which the polyelectrolyte adsorbs to the IER. For example, an IER may be contacted with a first mixture at a relatively high temperature, and then quickly cooled to about room temperature using air or solution cooling. It is also generally known by those skilled in the art that hydrophilic units, such as ethylene oxide (or ethylene glycol), can be effective in reducing the overall propensity of biological macromolecules, or biofouling agents, to adsorb to surfaces (see, e.g., Harris, *Poly(ethylene glycol) Chemistry: Biotechnical and Biomedical Applications*, Plenum Press, New York, 1992). U.S. Pat. No. 6,660,367, which is incorporated herein by reference, discloses materials that include ethylene glycol units that are effective at resisting the adsorption of hydrophilic proteins in microfluidic devices. The ethylene oxide (or ethylene glycol) repeat units may be present as blocks within a block copolymer. Preferably, the block copolymer also may include blocks of charged repeat units, preferably aromatic sulfonates, which can allow the material to be incorporated into a polyelectrolyte complex. Not wishing to be bound by any particular theory, it is believed that, in some embodiments, sufficient ethylene oxide repeat units are included to promote resistance to protein adsorption, but too many ethylene oxide units may discourage or not allow the adsorbance of a polyelectrolyte to an IER. Therefore, in some embodiments, the mole ratio of charged to neutral repeat units at the surface of an IER is about 10:1 to about 1:4, or about 5:1 to about 1:2.

Ethylene oxide repeat units may also be employed in comb polymers, preferably with a main, charged chain including a plurality of at least one of the charged repeat units described herein, and oligomers or polymers of ethylene oxide units grafted to the main chain. Such an architecture is generally referred to as a comb polymer, where the charged backbone represents that backbone of the comb and the grafted ethylene oxide oligomers or polymers represent the teeth of the comb.

Generally, the first mixture may include any known polyelectrolyte, including those described herein, and a liquid. The liquid may be a liquid in which a polyelectrolyte is soluble. A polyelectrolyte is soluble in a liquid when at least 1 g of the polyelectrolyte will dissolve in 100 mL of the liquid at 25° C. and 1 atm.

When a polyelectrolyte is soluble in the liquid, the liquid may be referred to herein as a "solvent." Selection of a solvent may depend on whether the polyelectrolyte is hydrophobic or hydrophilic. Generally, a hydrophobic polymer displays less favorable interaction energy with water than a hydrophilic polymer. While a hydrophilic polymer may be water soluble, a hydrophobic polymer may only be sparingly soluble in water, or, more likely, insoluble in water. A polyelectrolyte is "insoluble" in water when 0.03 g or less of the polyelectrolyte dissolves in 100 mL of water at 25° C. and 1 atm.

Generally, a hydrophobic polyelectrolyte is more likely to be soluble in an organic liquid than a hydrophilic polymer.

In general, the higher the carbon to charge ratio of the polyelectrolyte, the more hydrophobic it tends to be. For example, PSS is considered to be hydrophilic, whereas SPEEK is considered to be hydrophobic. Therefore, in some embodiments, water is used as a solvent for hydrophilic polyelectrolytes, and organic solvents, such as ethanol, methanol, dimethylformamide, acetonitrile, carbon tetrachloride, methylene chloride, or a combination thereof, are used, in some embodiments, for hydrophobic polyelectrolytes.

In some embodiments, the first mixture includes salt ions. A wide variety of salt ions may be added to the first mixture before it contacts an IER, while it contacts an IER, or a combination thereof. The salt ion may include any cation selected from the alkali metal cations, alkaline earth metal cations, transition metal cations, semi-metallic cations, organic cations, such as amines or quaternary ammoniums, or a combination thereof. The alkali metal cations may include lithium, sodium, potassium, rubidium, or a combination thereof. In some embodiments, the alkali metal cations include sodium, potassium, or a combination thereof. The alkaline earth metal cations may include magnesium, calcium, strontium, barium, or a combination thereof. Calcium and magnesium cations are used in some embodiments, and for physiological applications, the choice of alkaline earth metal cations may be limited to calcium and/or magnesium. Other metal cations that may be used in the first mixture include organic cations, such as ammonium, primary, secondary, and tertiary amines, quaternary ammoniums including alkyl groups having from one to eight carbon atoms, or a combination thereof. Primary amines, secondary amines, and tertiary amines may be protonated to achieve a positive charge and, therefore, are typically pH sensitive. Non-limiting examples of primary amines, secondary amines, and tertiary amines include protonated forms of methylamine, dimethylamine, trimethyl amine, ethylamine, diethylamine, trimethylamine, or a combination thereof. Quaternary amines may be pH insensitive. Non-limiting examples of quaternary amines include tetramethylammonium, tetraethylammonium, tetrapropylammonium, or a combination thereof. In some embodiments, the amine is a linear polyamine, such as ethylene diamine, diethylene triamine, dipropylene triamine, triethylene tetraamine, tripropylene tetraamine, tetraethylene pentaamine, tetrapropylene pentaamine, spermine, or spermidine.

The anion for the salt optionally added to the first mixture may include a halide anion, an oxoanion, an organic anion, or a combination thereof. The halide ions may include fluoride, chloride, bromide, iodide, or a combination thereof. The oxoanions may include sulfonate, sulfate, sulfite, phosphate, phosphite, phosphonate, pyrophosphate, hypochlorite, chlorite, chlorate, perchlorate, iodate, periodate, bromate, borate, carbonate, nitrate, nitrate, aluminate, manganate, or a combination thereof. The organic anions may include carboxylates, such as citrate, lactate, acetate, benzoate, formate, malate, malonate, fumarate, oxalate, propionate, butyrate, tartrate, valerate, phthalate, or a combination thereof.

Other salts that may be used include chloride salts, citrate salts, phosphate salts, or a combination thereof. The chloride salts may include sodium chloride, potassium chloride, magnesium chloride, calcium chloride, aluminum chloride, or a combination thereof. The citrate salts may include trisodium citrate, disodium hydrogencitrate, sodium dihydrogencitrate, tripotassium citrate, dipotassium hydrogencitrate, potassium dihydrogencitrate, magnesium citrate, calcium citrate, or a combination thereof. The phosphate salts may include trisodium phosphate, disodium hydrogen phosphate, sodium dihydrogen phosphate, tripotassium phosphate, dipotassium hydrogen phosphate, potassium dihydrogen phosphate, disodium potassium phosphate, sodium dipotassium phosphate, sodium potassium hydrogen phosphate, calcium phosphate, magnesium phosphate, or a combination thereof.

In some embodiments, the methods described herein include crosslinking the at least a portion of the polyelectrolyte that is adsorbed to the at least a portion of the surface of the ion exchange resin.

The crosslinking may include (i) contacting the at least a portion of the polyelectrolyte with a crosslinking agent, (ii) heating the composition, (iii) contacting the composition with light for a time effective to photo-crosslink the at least a portion of the polyelectrolyte, or (iv) a combination thereof.

In some embodiments, chemical crosslinking is introduced into the polyelectrolyte that is adsorbed to the IER. The chemical crosslinking may alter one or more characteristics of the composition, including, but not limited to, stability and toughness. In some embodiments, after forming a coating of a polyelectrolyte on an IER, the polyelectrolyte may be treated with a difunctional crosslinking agent, such as $XCH_2$-φ-$CH_2X$, wherein X is a halogen (Cl, Br, or I) and φ is a phenyl group. The phenyl group may be replaced by another aromatic or aliphatic moiety, and easily-displaceable groups, such as toluene sulfonate, may replace the halogen. In some embodiments, a preferred crosslinking agent is a dihalogenated compound, such as an aromatic or aliphatic dibromide, which can be able to alkylate residual unalkylated units on two adjoining polyelectrolyte chains.

In some embodiments, the chemical crosslinking of a polyelectrolyte that is adsorbed to an IER is achieved by heat treatment. For example, Dai et al. (Dai et al., *Langmuir* 17, 931 (2001)) disclose a method of forming amide crosslinks by heating a polyelectrolyte multilayer that includes amine and carboxylic acid groups. Optionally, the carboxylic acid groups may be activated by transforming them into acid chlorides or anhydrides. Yet another method of introducing crosslinking that may be used is disclosed by Kozlovskaya et al. (Kozlovskaya et al., *Macromolecules*, 36, 8590 (2003)), and includes the addition of a carbodiimide, which can activate chemical crosslinking. In some embodiments, the level of chemical crosslinking is about 0.01% to about 50%, or about 0.1% to about 10%.

In some embodiments, the chemical crosslinking of a polyelectrolyte on an IER includes photocrosslinking. Photocrosslinking may be achieved by the light-induced decomposition or transformation of functional groups, such as diarylbenzophenones, that form part of the polyelectrolyte molecules. Examples of photocrosslinking are disclosed in the relevant literature (see, e.g., Strehmel, V., Handbook of Photochemistry and Photobiology (2003), 2, 1-110; Allen, Norman S., Photochemistry (2004), 35, 206-271; Timpe, Hans-Joachim, Desk Reference of Functional Polymers (1997), 273-291, and Smets, G., Journal of Macromolecular Science, Chemistry (1984), A21 (13-14), 1695-703). In some embodiments, photocrosslinking of a polyelectrolyte adsorbed to an IER is accomplished by infusing the polyelectrolyte with a small photoactive crosslinker molecule, such as diazidostilbene, and then exposing the polyelectrolyte to light.

In some embodiments, the polyelectrolyte complex includes physical crosslinks created by hydrogen bonding. Hydrogen bonding is generally weaker than chemical bonding, and can occur between a hydrogen bond donor and a hydrogen bond acceptor. Hydrogen bonds typically are minimally impacted by the presence of salt and thus the level of physical crosslinking due to hydrogen bonding can remain substantially the same as the salt concentration is varied. Accordingly, the polyelectrolyte adsorbed to an IER may include polymer repeat units capable of hydrogen bonding. Examples of hydrogen bond donor/acceptor pairs are disclosed in U.S. Pat. Nos. 6,740,409 and 7,470,449, as well as U.S. Patent Application No. 2005/0163714, each of which is incorporated herein by reference.

In the descriptions provided herein, the terms "includes," "is," "containing," "having," and "comprises" are used in an open-ended fashion, and thus should be interpreted to mean "including, but not limited to." When compositions or methods are claimed or described in terms of "comprising" various components or processing features, the compositions and methods can also "consist essentially of" or "consist of" the various components or processing features, unless stated otherwise.

The terms "a," "an," and "the" are intended to include plural alternatives, e.g., at least one. For instance, the disclosure of "an ion exchange resin," "a polyelectrolyte," and the like, is meant to encompass one, or mixtures or combinations of more than one ion exchange resin, polyelectrolyte, and the like, unless otherwise specified.

The processes described herein may be carried out or performed in any suitable order as desired in various implementations. Additionally, in certain implementations, at least a portion of the processes may be carried out in parallel. Furthermore, in certain implementations, less than or more than the processes described may be performed.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Materials and Preparation of a Composition

Unless otherwise noted, the following materials were used in the examples herein. DOWEX® 1×2 [50-100 mesh (Cl-form), 2% divinylbenzene (DVB)], DOWEX®1×8 [50-100 mesh (Cl), 8% divinylbenzene], were obtained from Alfa Aesar, and DOWEX® 50W-X8 [60-170 mesh (H), 8% divinylbenzene] was obtained from Merck KGaA.

The following table summarizes the physicochemical properties of the ion exchange resins used in the following examples.

| Physicochemical properties of the ion exchange resins used in the following Examples. | | | | | |
|---|---|---|---|---|---|
| Resin | Functional group | Form | Particle size (mesh) | Cross-linkage (%) | Capacity (mol L$^{-1}$) |
| DOWEX® 1 × 2 | Quaternary amine | Chloride | 50-100 | 2 | 0.8 |
| DOWEX® 1 × 8 | Quaternary amine | Chloride | 50-100 | 8 | 1.4 |
| DOWEX® 50W-X8 | Sulfonic acid | Hydrogen | 60-170 | 8 | 1.7 |

Sodium sulfate (Na$_2$SO$_4$) and sodium chloride (NaCl) were purchased from Fisher. Poly (4-styrenesulfonic acid) (PSS, molar mass=1 640 and 70 000 Da) were obtained from Scientific Polymer Products, Inc.

Polystyrene (MW=600 000 g mol$^{-1}$) was synthesized from a 311 000 Da polystyrene standard and sulfonated. PSS was neutralized using NaOH to give the sodium salt. Sulfur-35 labeled sulfate was obtained from PerkinElmer as a stock solution of 1 mCi Na$_2$$^{35}$SO$_4$ in 1 mL of water with a specific activity of 1494 Ci mmol$^{-1}$. $^{35}$S is a beta emitter with a half-life of 87.4 days and an E$_{max}$=167 KeV. EcoLite(+)™ Liquid Scintillation Cocktail (LSC) was supplied from MP Biomedicals and used as received.

1 M NaOH (Macron) and 0.1 M NaOH solutions from Sigma Aldrich were used for pH adjustment and all solutions were prepared with 18 MS2 deionized water.

Resin beads were pre-washed by suspension in deionized water at 70° C. in a hot shaker for 2 days. The supernatant was decanted every 8 to 12 hours, and the rinsing solution was changed. DOWEX® 1×2 and 1×8 resin particles were dip-coated using a series of PSS with different molecular weights (M$_w$) of 1640, 70000 or 600000 Da.

DOWEX® 1×8 resins were also coated with PSS$_{0.75}$-co-AEDAP$_{0.25}$ and PSS$_{0.5}$-co-AEDAPS$_{0.5}$.

Polymer solution concentrations of this example were 0.1 mM, 1 mM and 2 mM (with respect to the monomer) for PSS in water and sodium chloride and 0.1 mM for PSS$_{0.75}$-co-AEDAPS$_{0.25}$ and PSS$_{0.5}$-co-AEDAPS$_{0.5}$ in water.

Example 2—Synthesis of Aromatic Sulfonate/Zwitterion Copolymers

PSS that included 25 mol % of the 3-[2-(acrylamido)-ethyldimethyl ammonio] propane sulfonate zwitterionic group (AEDAPS) (PSS$_{0.75}$-co-AEDAPS$_{0.25}$) was synthesized by adding 2.8 g (11.97 mmol) of NaSS and 1.06 g (4 mmol) of AEDAPS to 12 mL of water in a 100 mL three-neck round-bottom flask under N$_2$. The solution was heated to 65° C., and 0.1 wt % ammonium persulfate was added. The mixture was allowed to polymerize for 45 minutes.

Dialysis was then performed against water (using Spectra/Por 12,000-14,000 MWCO tubing) for 40 hours. The polymer was finally freeze-dried to form a white powder (42% yield) and characterized using $^1$H-NMR.

Similarly, PSS including 50 mol % of AEDAPS (PSS$_{0.5}$-co-PAEDAPS$_{0.5}$) was made by adding 2.8 g (11.97 mmol) of NaSS and 3.17 g (11.99 mmol) of AEDAPS to 12 mL of water.

The same procedure used for PSS$_{0.75}$-co-AEDAPS$_{0.25}$ was then repeated to synthesize the PSS$_{0.5}$-co-PAEDAPS$_{0.5}$ copolymer with a 40% yield.

The polymers of this example included those having a structure according to the following formulas:

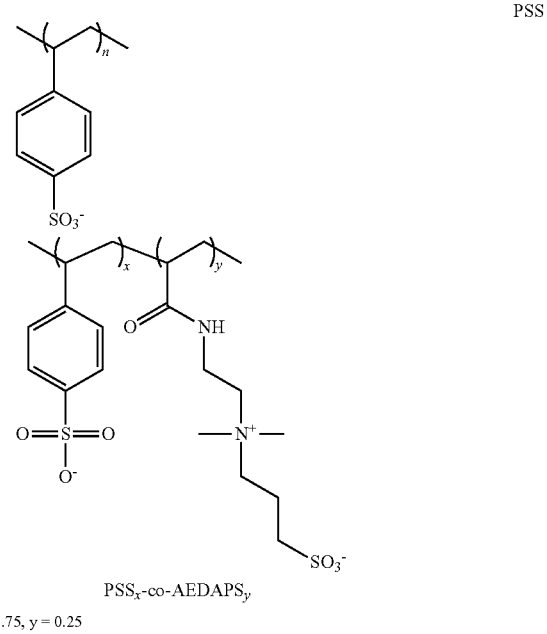

PSS

PSS$_x$-co-AEDAPS$_y$ x = 0.75, y = 0.25
x = 0.5, y = 0.5

The polymers used in this example also are described in the following table:

| Polymers | M | n | Conversion (%) | M$_W$ × 10$^3$ (g mol$^{-1}$) | M$_w$/M$_n$ |
|---|---|---|---|---|---|
| PSS 1.6 | — | — | — | 1.64 | 1.12 |
| PSS70 | — | — | — | 70 | 2.01 |
| PSS 600 | — | — | — | 600 | |
| PSS$_m$-co-AEDAPS$_n$ | 0.75 | 0.25 | 44.2 | 245 | 1.98 |
| | 0.50 | 0.50 | 46.3 | 350 | 2.03 |

M, n: mole fractions of monomer from monomer feed ratio

Example 3—Adsorption of Polymers to IERs

For each experiment of this example, approximately 300 mg of ion exchange resin was transferred in water to a cuvette, and treated with 3 mL of the polymer solution while gently being stirred for 6 minutes.

The beads were allowed to settle at 30 second intervals, and the supernatant was assayed using UV-vis spectroscopy. Absorbance was measured using quartz cells with a reference solution containing the corresponding solvent.

Spectra were collected using a Cary 100 Bio UV-visible spectrophotometer (Agilent, USA). Scans were performed between 200 nm and 500 nm, and analyzed using Cary WinUV (Agilent, USA). Absorbance values at 261 nm were recorded and normalized. The amount of polymer adsorbed on a resin was determined by the following equation, which defines the loss of the supernatant's absorption after the addition of the resin beads:

$$A_d = A_0 - A_t \quad [1]$$

wherein $A_d$ is the absorbance decrease, $A_0$ is the absorbance of the polymer solution before the addition of the resin beads, and $A_t$ is the absorbance of the supernatant at a given time t.

The difference in absorption was then converted to the polymer sorption on the resin beads.

After decanting the supernatant, the beads were rinsed with deionized water and the same volume of fresh polymer solution was added and stirred again for 6 minutes. The resin beads were finally rinsed with water to remove un-adsorbed polyelectrolytes, and then stored in water.

Example 4—Self-Exchange Kinetics

The kinetics of a sulfate ion isotopic exchange reaction were studied using radiolabeled sulfate. $10^{-2}$ M $Na_2{}^{35}SO_4$ solution with a specific activity of 0.1 Ci mol$^{-1}$ was prepared by adding 69 µL of a "hot" (radiolabeled) stock solution to a "cold" (unlabeled) $10^{-2}$ M $Na_2SO_4$ solution up to a total volume of 50 mL.

300 mg of uncoated, PSS-coated, $PSS_{0.75}$-co-AEDAPS$_{0.25}$-coated, and $PSS_{0.5}$-co-AEDAPS$_{0.5}$-coated DOWEX® 1×8 resin particles were each soaked in 10 mL of unlabeled 0.1 M $Na_2SO_4$.

Sulfate ions were allowed to exchange with the chloride ions of the anion exchange resin overnight. The resins were then rinsed with water to remove un-exchanged sulfate. This procedure was repeated twice to ensure a complete, or near complete, exchange of chloride to sulfate. The beads were then washed thoroughly with deionized water, left in water for 12 hours, and air-dried at room temperature. 10 mg of each of the four samples was then soaked in 10 mL of labeled sulfate for 72 hours in glass scintillation vials to ensure a relatively large excess of ions in solution, which was at least 15 times higher than the amount estimated to be in the resin particles of this example.

After 72 hours, the beads were washed with distilled water twice to remove unbound ions. During the rinsing steps, a few milliliters of water were added to the vials, then withdrawn with a pipette. The beads were subsequently stored in distilled water for 24 hours, and then dried in air for 12 hours. 6 mL of $10^{-2}$ M unlabeled sulfate were added to the beads to study the kinetics of the self-exchange of labeled to unlabeled sulfate.

The "cold" sulfate solution added an excess of unlabeled sulfate compared to the amount of "hot" sulfate contained in the beads. The solution was added at t=0, and stirred during the exchange. At each time point, the stirring was stopped, and 300 µL were withdrawn from the solution and added to a glass vial containing 6 mL LSC. The content of the vials, corresponding each to a time point, was homogenized using a vortex mixer.

The sample vials containing the extracts were then counted on the bare window of a 2" diameter photomultiplier tube (PMT, RCA 8850). The high voltage supply connected to the PMT was fixed at 2130 V. A Philips PM6654C frequency counter was used to record the counts, a process facilitated by LabView software operated on a computer interfaced with the counter.

The pulse threshold was fixed at −20 mV and the gate time at 10 seconds. During the counting, each vial was covered with a white cup to minimize the loss of back-scattered radiation. The total number of counts taken for each data point was between 70,000 and 800,000, with respective counting errors of 0.4% and 0.1%.

The counting efficiency (the ratio of number of counts per second over the disintegrations per second) was about 40%. To convert counts to moles, a calibration curve was built by dispensing 1-5 µL of the same radiolabeled solution in 5 vials containing 6 mL LSC in addition to 299-295 µL $10^{-2}$ M unlabeled sulfate. Two corrections were performed to adjust the number of counts at each time point: the adjustment to the total volume and the correction of the missing counts from the previous time points. The diffusion coefficient of sulfate ions in the beads was then determined.

Example 5—Algal Attachment and Growth

*Chlamydomonas reinhardtii* wild-type strain 137c (CC-124) was obtained from the *Chlamydomonas* Genetics Center, Duke University, Durham, N.C. Cells were harvested in 250 mL flasks at 25° C. with continuous aeration under a cycle of 14 hours fluorescent light/10 hours dark.

A total of 300 mg of the resin beads of the foregoing examples were packed in a 1 mL column. 5 mL of algal suspension with a concentration of 1×10$^6$ cells mL$^{-1}$ was passed through the column dropwise in 1 mL increments. The prepared resin beads were then washed with deionized water to collect unbound cells.

Recovered algal cells were counted to determine the percent attachment to the ion exchange resin. The cells were fixed in an equal volume of 2% glutaraldehyde and counted using a hemocytometer with the aid of a phase-contrast microscope (Carl Zeiss, Thornwood, N.Y.). Cell viability was obtained through microscopic examination by adding 0.2% trypan blue to an equal amount of cell suspension.

Example 6—Imaging Resins

Figure 1B:
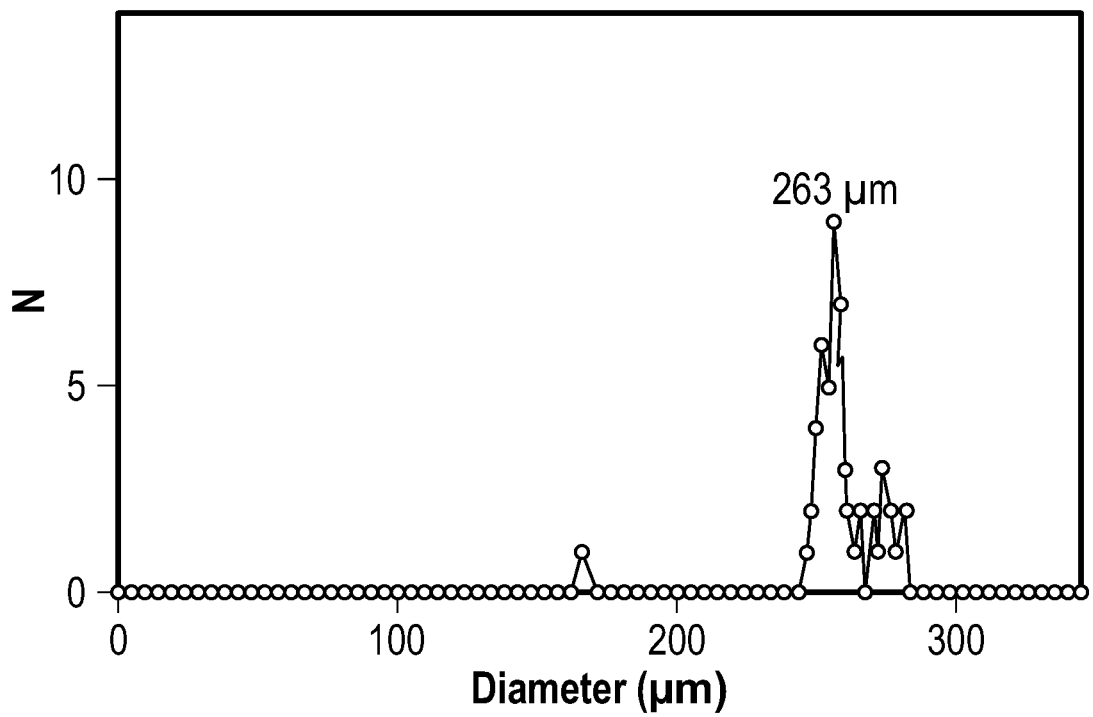
FIG. 1B depicts a size distribution plot of one embodiment of an ion exchange resin.

Commercial DOWEX® anion exchange resins with 2% and 8% DVB were employed in this example. Optical microscopy images were used to determine the resin size distribution of the DOWEX® 1×2 (FIG. 1A) and DOWEX® 1×8 (FIG. 1B) samples beads.

The DOWEX® 1×2 beads showed a non-uniform size distribution with approximately 54% of the beads having a mean diameter of 71 (±15) µm, and 46% with a mean bead diameter of 270 (±19) µm.

By comparison, the DOWEX® 1×8 particles were more uniformly distributed with an average particle size of 263 (±16) µm.

The coating and antifouling experiments reported in the examples herein were performed using the DOWEX® 1×8 particles unless otherwise stated. The a) uncoated, b) PSS-coated, c) PSS0.75-co-AEDAPS0.25-coated, and d) PSS0.5-co-AEDAPS0.5-coated ion exchange resins were also imaged using scanning electron microscopy.

Example 7—IER Coatings with Anionic Homo-
and Co-Polymers with Zwitterion Repeat Units The sorption of anionic PSS70 onto positively charged DOWEX® 1×8 resin beads was monitored using UV-visible spectroscopy. Polymer sorption refers to the absorption of the chains into the beads in addition to their adsorption to the surface. Resin particles were immersed in 1 mM PSS70 and the absorption spectra of the supernatant were collected at 30 second time intervals to verify the successful sorption of the polymer. The decrease in absorbance of the PSS70 solution reflected the extent of polymer sorption onto the resin particles.

Figure 2:
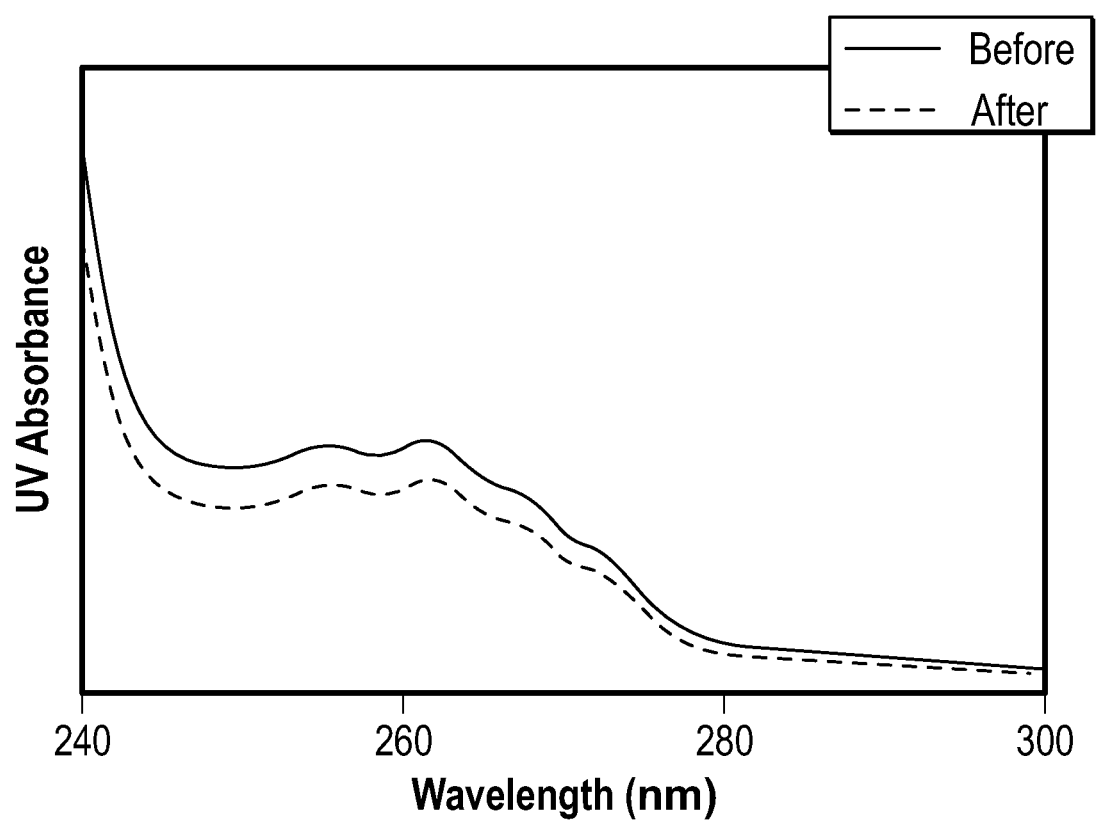
FIG. 2 depicts UV absorbance spectra of an embodiment of a polyelectrolyte before and after being contacted with an embodiment of an ion exchange resin.

FIG. 2 depicts the UV absorbance spectra of 1 mM PSS in 1 M NaCl before and after the addition of resin beads for 6 minutes. Specifically, FIG. 2 depicts the UV absorption spectra of 1 mM PSS in 1 M NaCl before (solid line) and after (dotted line) the addition of 300 mg of DOWEX® 1×8 resin particles for 6 minutes.

Figure 3A:
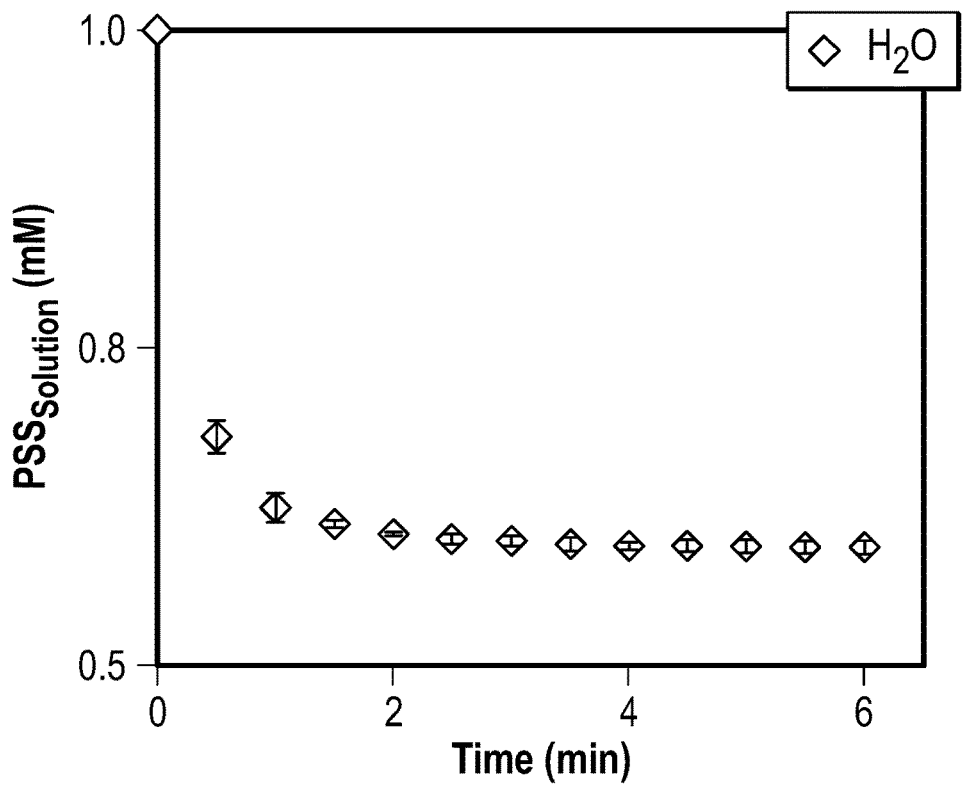
FIG. 3A depicts a decrease of the absorbance of an embodiment of a polyelectrolyte.

The absorbance values were then converted to the concentration of PSS70 remaining in solution, as depicted at FIG. 3A. In particular, the concentration of PSS70 (MW=70×103 g mol-1 wide MWD) in solution decreased from 1 mM to reach a plateau of 0.6 mM after 2 minutes.

Figure 3B:
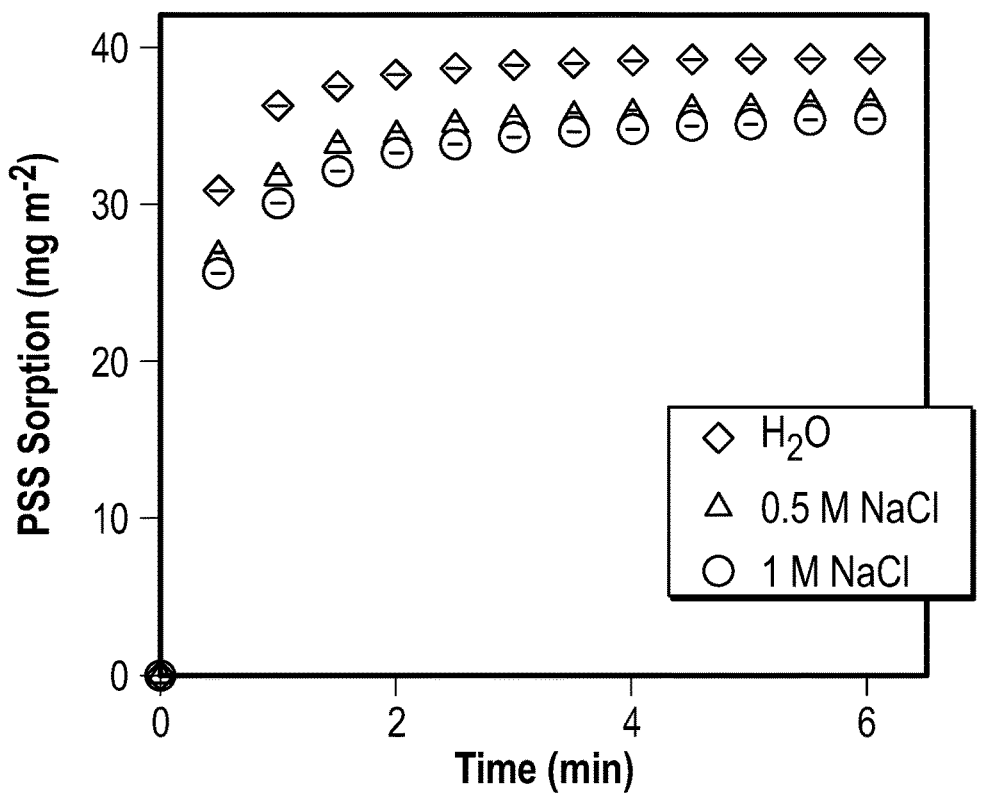
FIG. 3B depicts the sorption of an embodiment of a polyelectrolyte as a function of time.

The amount of polymers loaded onto the resin was then calculated and plotted as a function of time, as depicted at FIG. 3B. To evaluate the solvent effect, the resin beads were separately immersed in PSS70 dissolved in water, 0.5 M NaCl, and 1 M NaCl. The error bars of FIG. 3A and FIG. 3B are +/−1 std. dev. Specifically, FIG. 3B depicts PSS70 sorption on DOWEX® 1×8 resin particles as a function of exposure time to 1 mM PSS70 solution dissolved in water, 0.5 M NaCl, and 1 M NaCl.

Maximum sorption was attained in salt-free water with 39 mg of PSS70 $m^{-2}$ of resin compared to 36 mg $m^{-2}$ and 35 mg $m^{-2}$ in 0.5 M and 1 M NaCl (FIG. 3B). These values corresponded to 0.3% of the ion exchange sites. The amount of polymers supported on the resins in water was similar to that in salt solution, which suggested only a minor influence of the initial salt concentration.

The sorption experiments also were conducted using salt-free polymer solutions.

After the PSS70 sorption reached a constant value of 39 mg of PSS70 $m^{-2}$ of resin surface, the solution was decanted and the resin beads were rinsed with deionized water to remove unbound polymers.

Figure 4A:
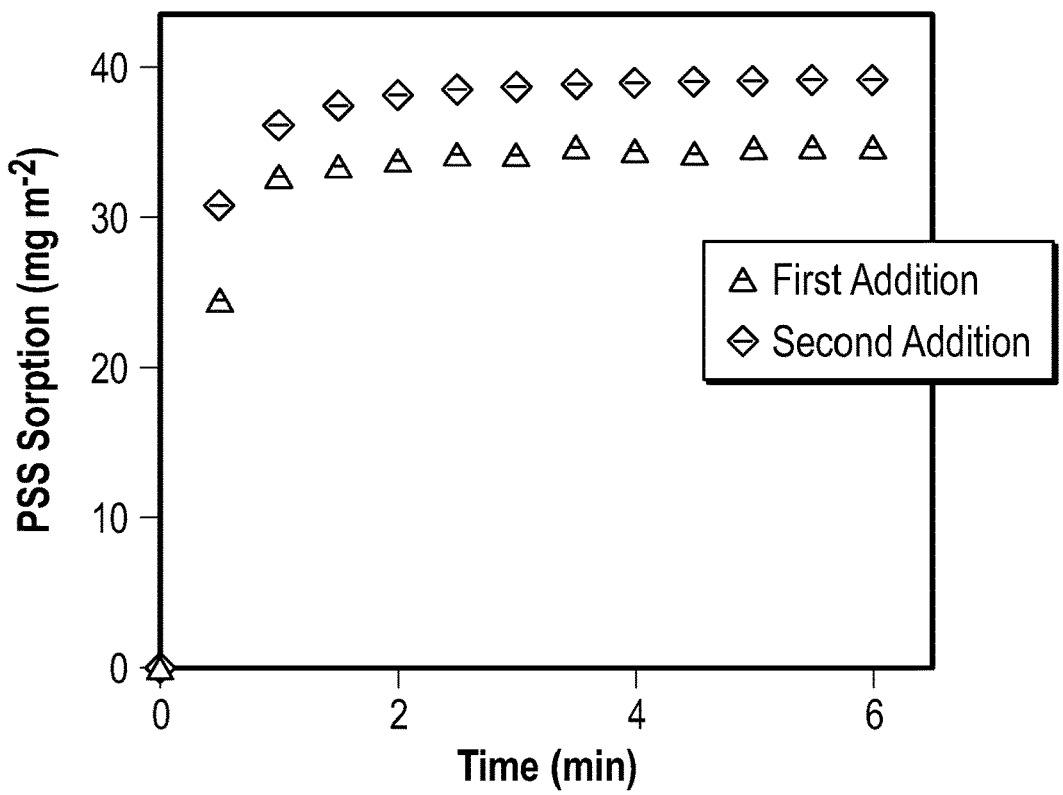
FIG. 4A depicts the sorption of an embodiment of a polyelectrolyte as a function of time during the addition of a first amount and a second amount of the polyelectrolyte.

The absorbance of the rinsing solution was measured to confirm the complete removal of unattached PSS70. Subsequently, a fresh solution of 1 mM PSS70 was added to the beads which resulted in further sorption of 35 mg $m^{-2}$ after 6 min (FIG. 4A). FIG. 4A depicts PSS70 (MW=70×10³ g mol-1) sorption on DOWEX® 1×8 resins after first and second addition of a 1 mM PSS70 solution as a function of time. Beads were rinsed with water before the addition of PSS70. Error bars are +/−1 std. dev.

Interestingly, the particles allowed the sorption of additional polymers from the freshly added solution, despite the fact that sorption from the initial solution reached a steady state value without fully consuming the polymer.

Figure 4B:
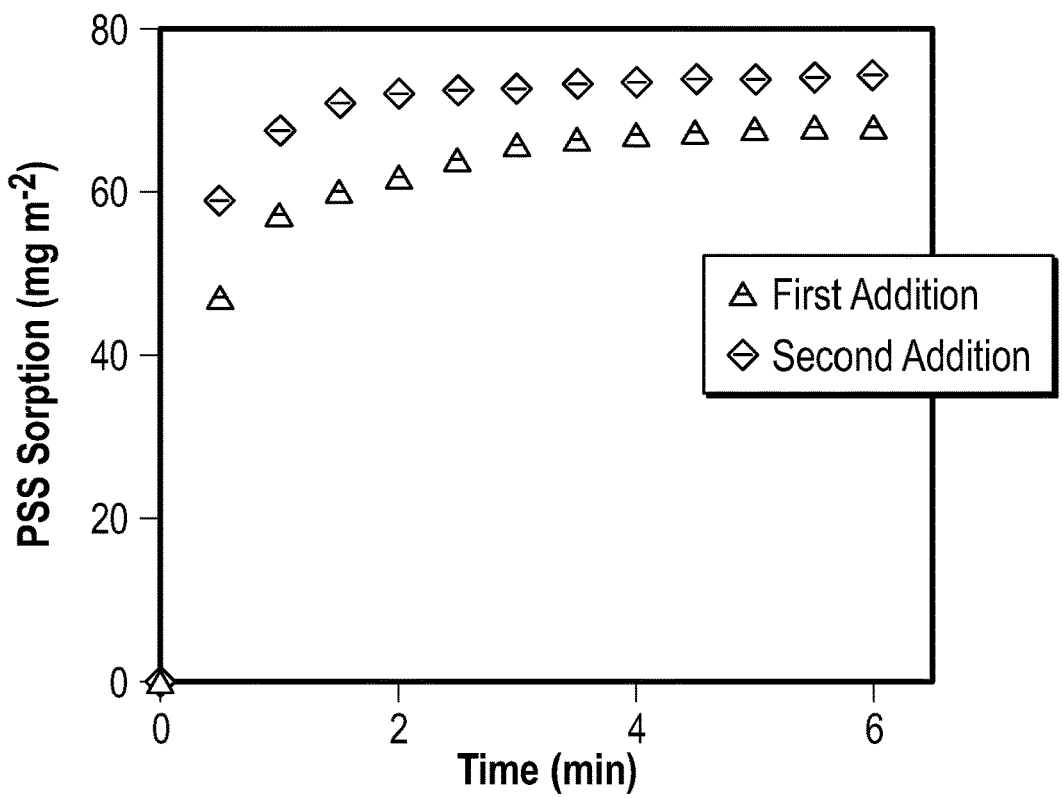
FIG. 4B depicts the sorption of an embodiment of a polyelectrolyte as a function of time during the addition of a first amount and a second amount of the polyelectrolyte.

The same procedure was then repeated with a starting solution of 2 mM PSS70. As expected, a twofold increase in PSS70 sorption was observed with 74 mg $m^{-2}$ coverage after the first addition and a further 68 mg $m^{-2}$ after the second addition (FIG. 4B), which was equivalent to a total of 0.12% of the ion exchange sites. The fraction of polymers loaded onto the beads was independent of the initial polymer concentration. FIG. 4B depicts PSS70 (MW=70×10³ g mol-1) sorption on DOWEX® 1×8 resins after first and second addition of a 2 mM PSS70 solution as a function of time. Beads were rinsed with water before the addition of PSS70. Error bars are +/−1 std. dev.

Example 8—Polyanion Molecular Weight

Resin beads were immersed in 1 mM of low molecular weight PSS 1.6. The change in PSS 1.6 sorption and the concentration of PSS 1.6 in solution over a period of 48 hours was plotted.

After 24 hours, PSS 1.6 solution decreased steadily to approximately zero. The corresponding PSS sorption resulted in a resin coverage of 92 mg PSS 1.6 $m^{-2}$ which was equivalent to 0.84% of the ion exchange resin sites. This result confirmed that the resin sites accessible to the polymers were not restricted to the surface, and that small molecular weight chains were able to diffuse through the pores of the anion exchange resins.

Figure 5A:
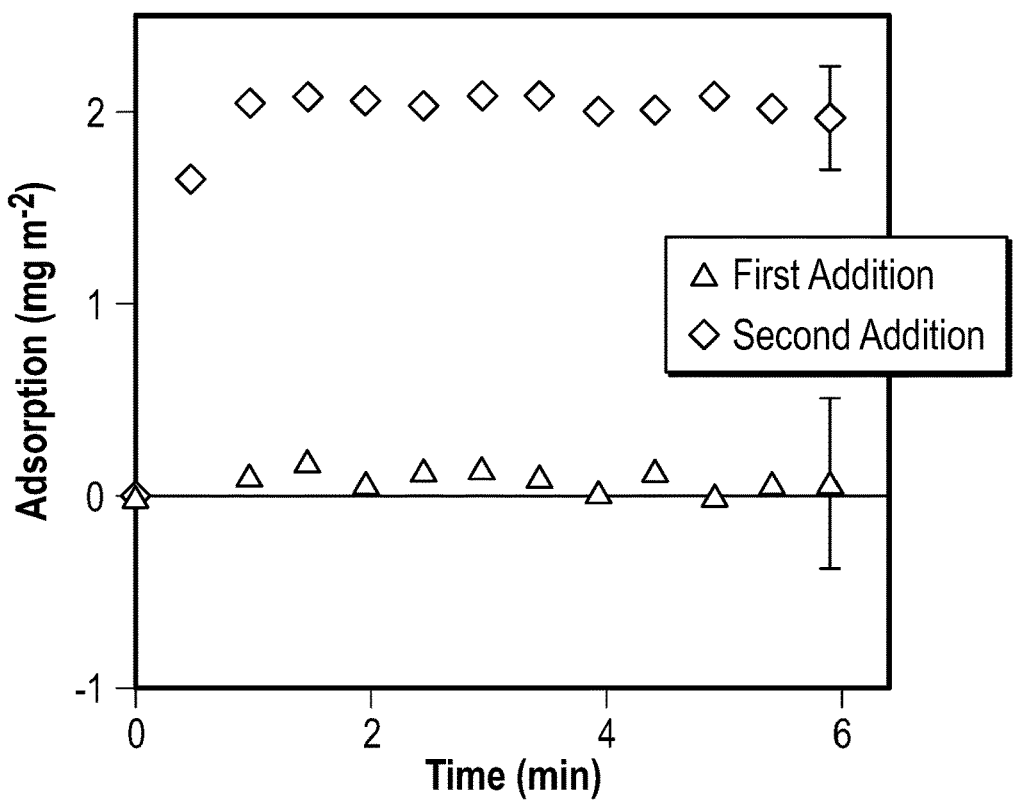
FIG. 5A, FIG. 5B, and FIG. 5C depict the adsorption of embodiments of polyelectrolytes to an embodiment of an ion exchange resin after a first and a second addition as a function of time.
Figure 5B:
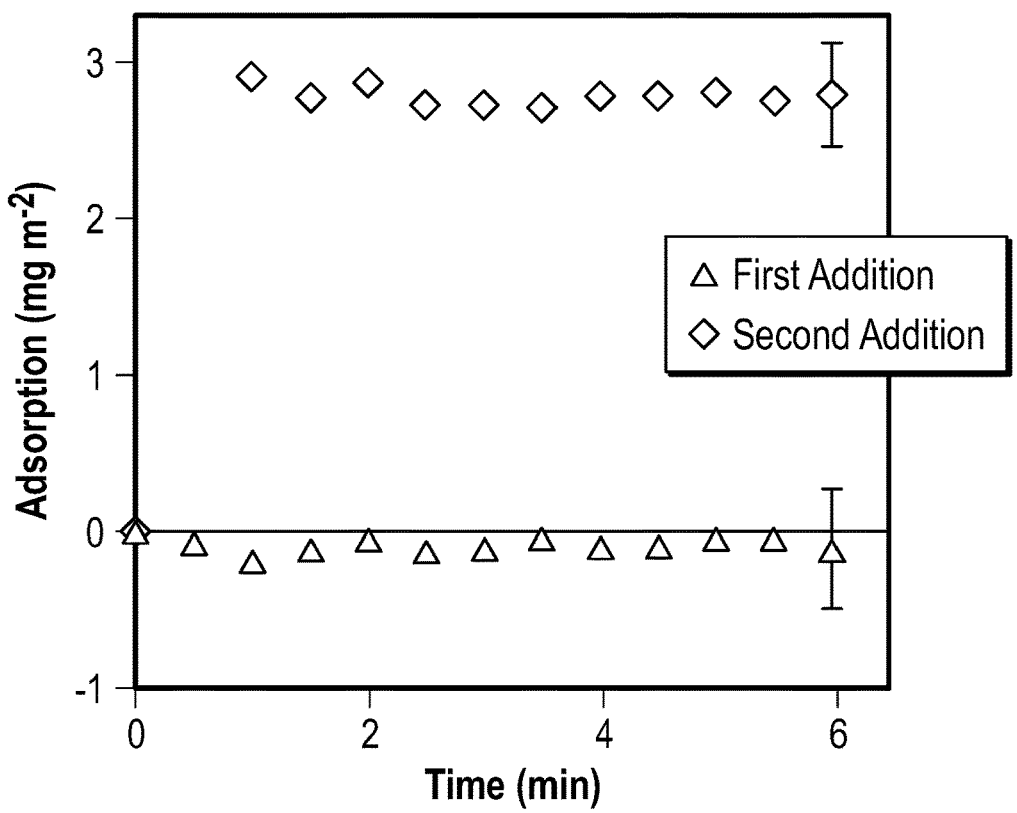

In another set of experiments, the effect of higher molecular weight PSS 600 on the dynamics of polymer sorption was studied. FIG. 5A shows that the particle-bound polymers approached a value of 2 mg of PSS600 $m^{-2}$ of resin surface occupying 0.017% of resin sites, which was significantly lower than the earlier experiments. FIG. 5B depicts PSS 600 (MW=600 000 Da) adsorption on DOWEX® 1×8 resin particles after the first and the second addition of the polymer solutions as a function of time. Error bars are +/−1 std. dev.

This steady-state value was reached within the first minute of exposure to the polymer solution. In contrast to the lower molecular weight polymers, the exposure to a fresh PSS 600 solution did not induce more adsorption, which suggested that the high molecular weight PSS 600 simply adsorbs to the bead surface (FIG. 6). These observations further validated that the lower molecular weight PSS 1.6 diffused within the beads and were not restricted by steric hindrance. 2 mg PSS per $m^2$ of resin was equivalent to a monolayer.

One possible explanation was the absorption of smaller molecular weight PSS70 chains through the pores of the resin particles. In this case, a plateau was reached when the small polymer chains in the solution were absorbed by the beads. The subsequent addition of a fresh PSS70 solution provided new supply of lower molecular weight chains which resulted in additional absorption.

Example 9—Coating with a PSS-Co-AEDAPS Copolymer

Figure 8A:
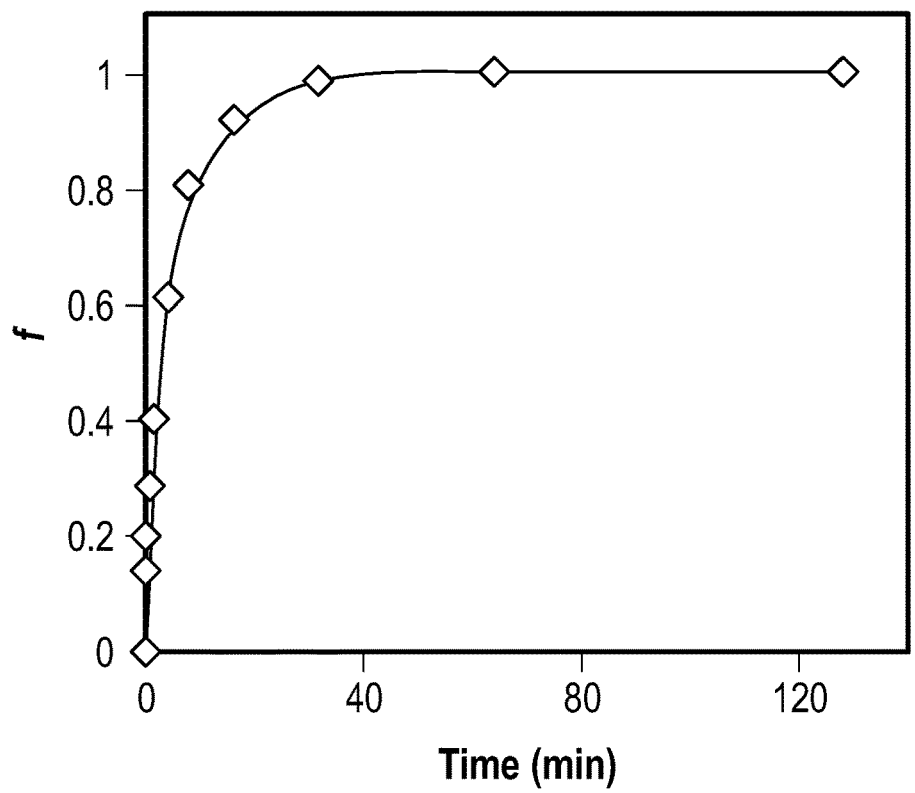
FIG. 8A depicts a plot of sulfate self-exchange vs. time for an embodiment of an uncoated ion exchange resin.
Figure 8B:
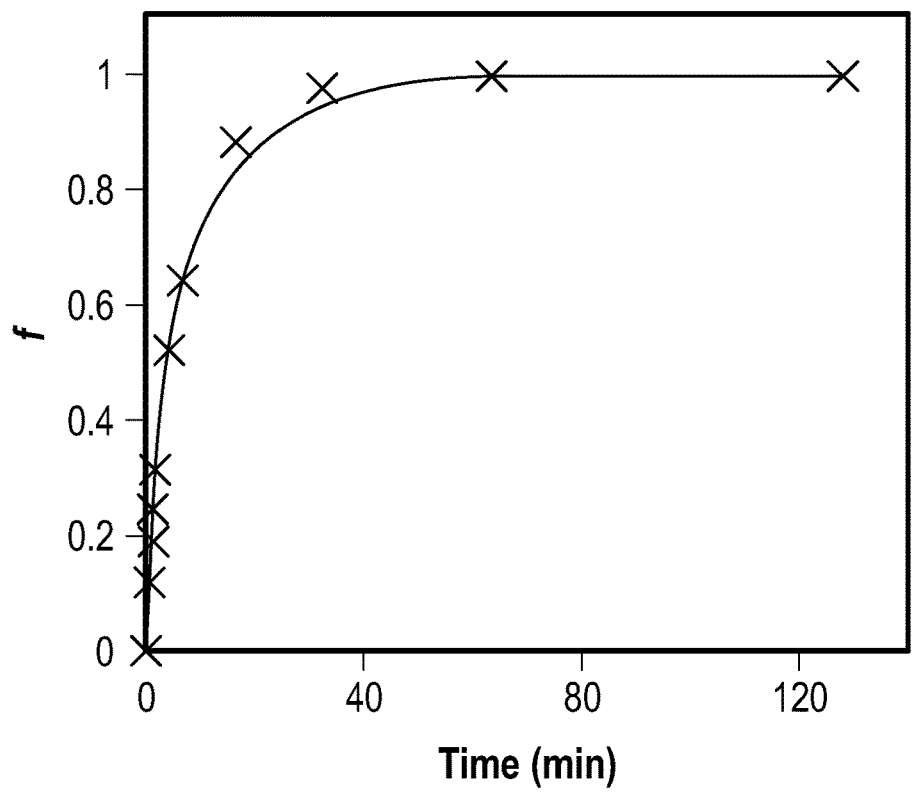
FIG. 8B, FIG. 8C, and FIG. 8D depict plots of sulfate self-exchange vs. time for an embodiment of an ion exchange resin that is coated with one of several embodiments of polyelectrolytes.
Figure 8C:
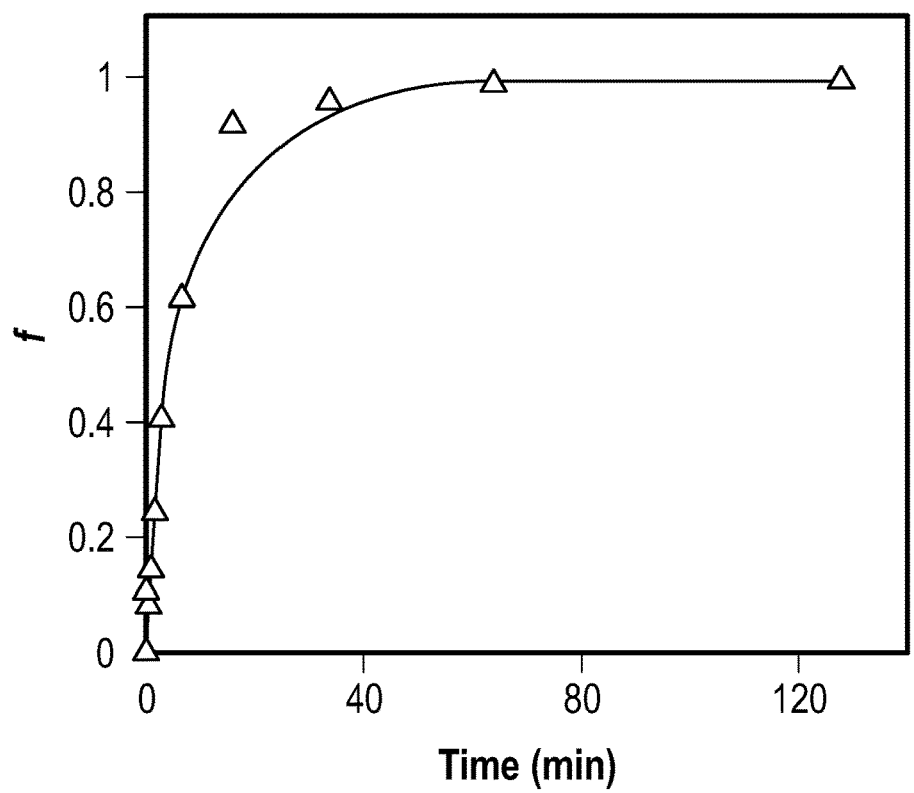
Figure 8D:
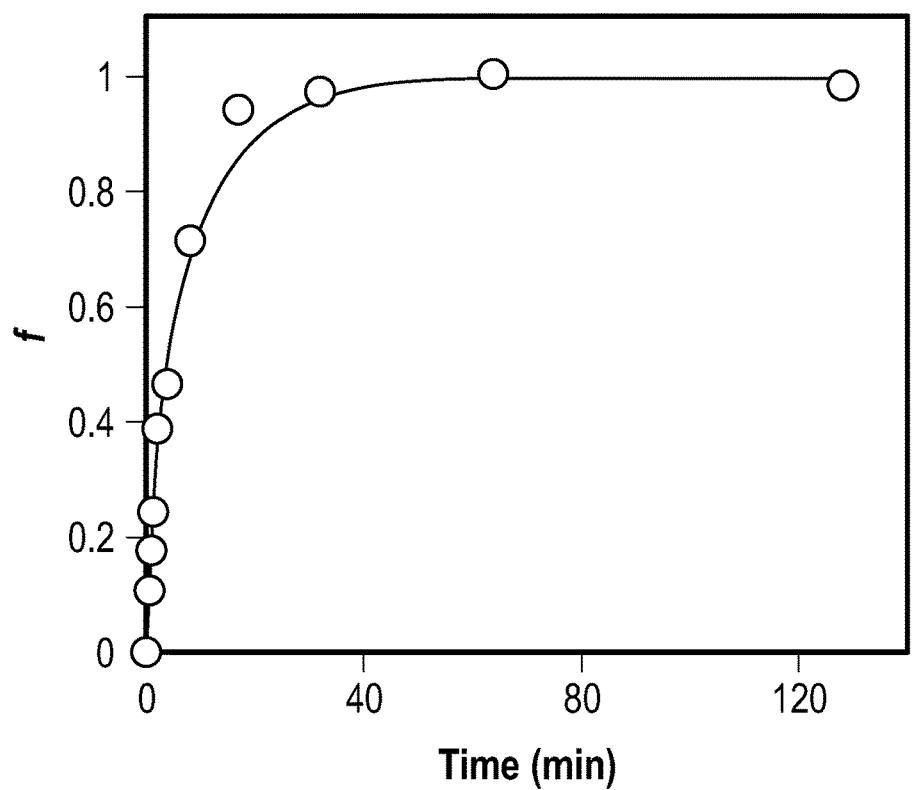

Resin samples were coated with $PSS_{0.75}$-co-$AEDAPS_{0.25}$, which is a random copolymer of 75 mol % styrene sulfonate and 25 mol % AEDAPS, by immersing the resin samples in a 0.1 mM solution of the copolymer in water. A constant surface coverage of 2.8 mg $m^{-2}$ of resin, which corresponded to 0.022% of the ion exchange sites, was reached after one min of exposure (FIG. 8B). FIG. 8B depicts the $PSS_{0.75}$-co-$AEDAPS_{0.25}$ adsorption on DOWEX® 1×8 resin particles after the first and the second addition of the polymer solutions as a function of time. Error bars are +/−1 std. dev.

Figure 5C:
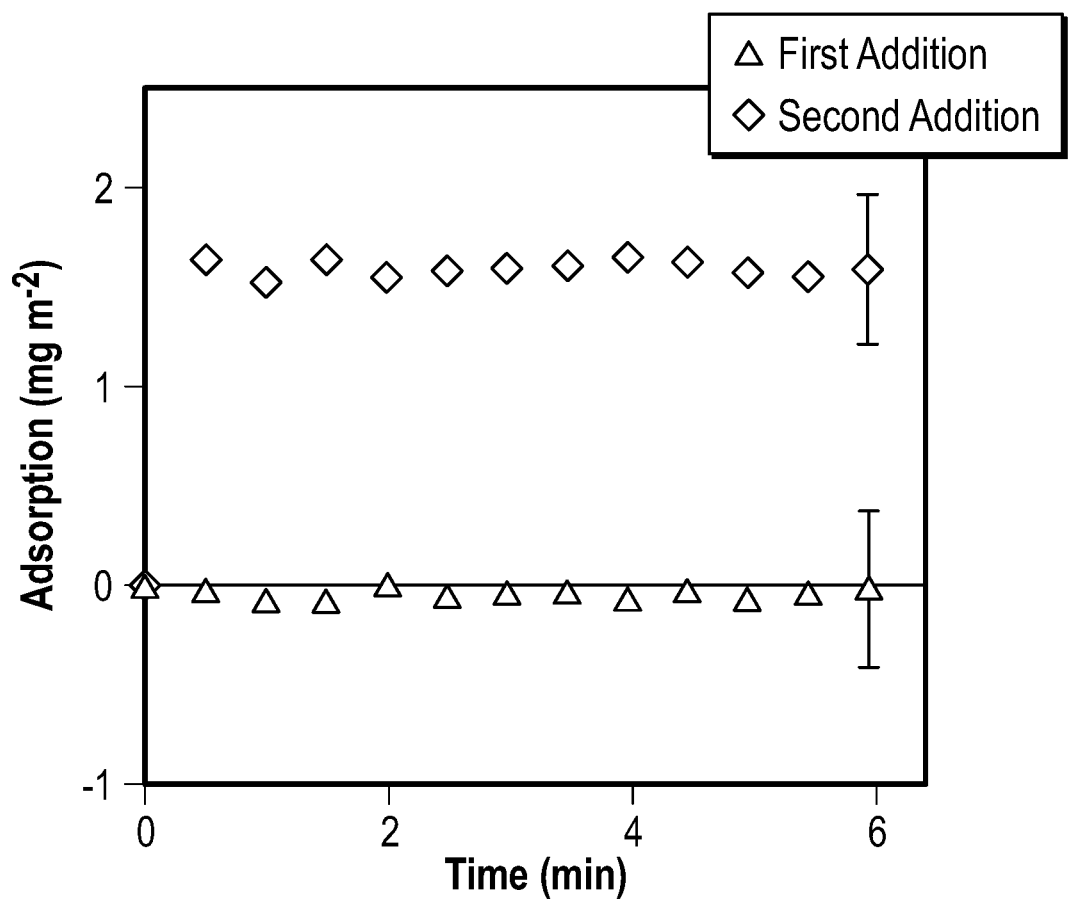

The addition of a fresh solution of the copolymer did not result in additional adsorption, which confirmed that the coating was restricted to the surface of the beads. Similarly, DOWEX® 1×8 resin particles were immersed in a 0.1 mM solution of $PSS_{0.5}$-co-$AEDAPS_{0.5}$. FIG. 5C shows that 1.6 mg $m^{-2}$ of resin were adsorbed onto the resin particles. This value represented 0.011% of the ion exchange resin sites. FIG. 5C depicts $PSS_{0.5}$-co-$AEDAPS_{0.5}$ adsorption on DOWEX® 1×8 resin particles after the first and the second addition of the polymer solutions as a function of time. Error bars are +/−1 std. dev.

After the beads were rinsed with water to remove unattached polymer chains, a fresh solution of the copolymer was added. No additional adsorption occurred after the first solution. Despite having a wide MWD, both copolymers had significantly higher molecular weights than PSS 76.

Figure 6C:
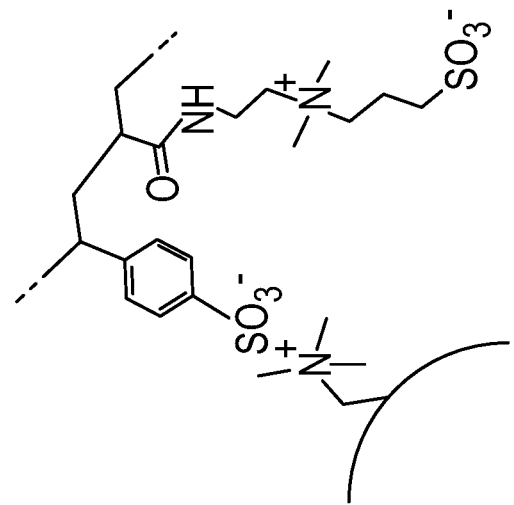
FIG. 6A, FIG. 6B, and FIG. 6C is a schematic showing an embodiment of an ion exchange resin coated with three different embodiments of polyelectrolytes.
Figure 6B:
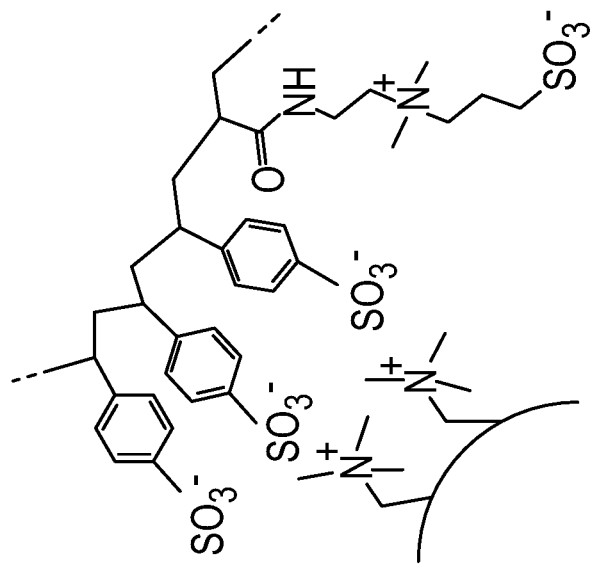
Figure 6A:
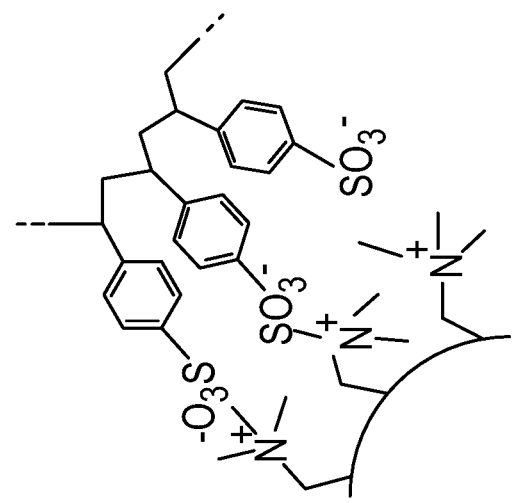

FIGS. 6A-C are schematics depicting the coating of a DOWEX® resin particle with (FIG. 6A) PSS, (FIG. 6B) PSS$_{0.75}$-co-AEDAPS$_{0.25}$, and (FIG. 6C) PSS$_{0.5}$-co-AEDAPS$_{0.5}$.

Example 10—Electron Microscopy Images of Uncoated and Coated Resins

Coated resin particles were then collected and stored in water. SEM micrographs of the control resin particles and coated samples were collected.

The images showed no difference in surface smoothness and morphology after the coating was applied to the resins. The beads were regularly shaped with no defects, irregularities or any changes resulting from the coating process.

Example 11—Ion Exchange Kinetics and Capacity

The influence of the polymeric coatings on the ion exchange rate and capacity was examined using isotopic exchange measurements. Specifically, a three-step approach was employed to study the self-exchange of sulfate ions through the resin particles. First, an excess of 0.1 M Na$_2$SO$_4$ was added to the resins in the chloride form, which resulted in a full exchange of chloride to sulfate ions (FIG. 7).

Figure 7:
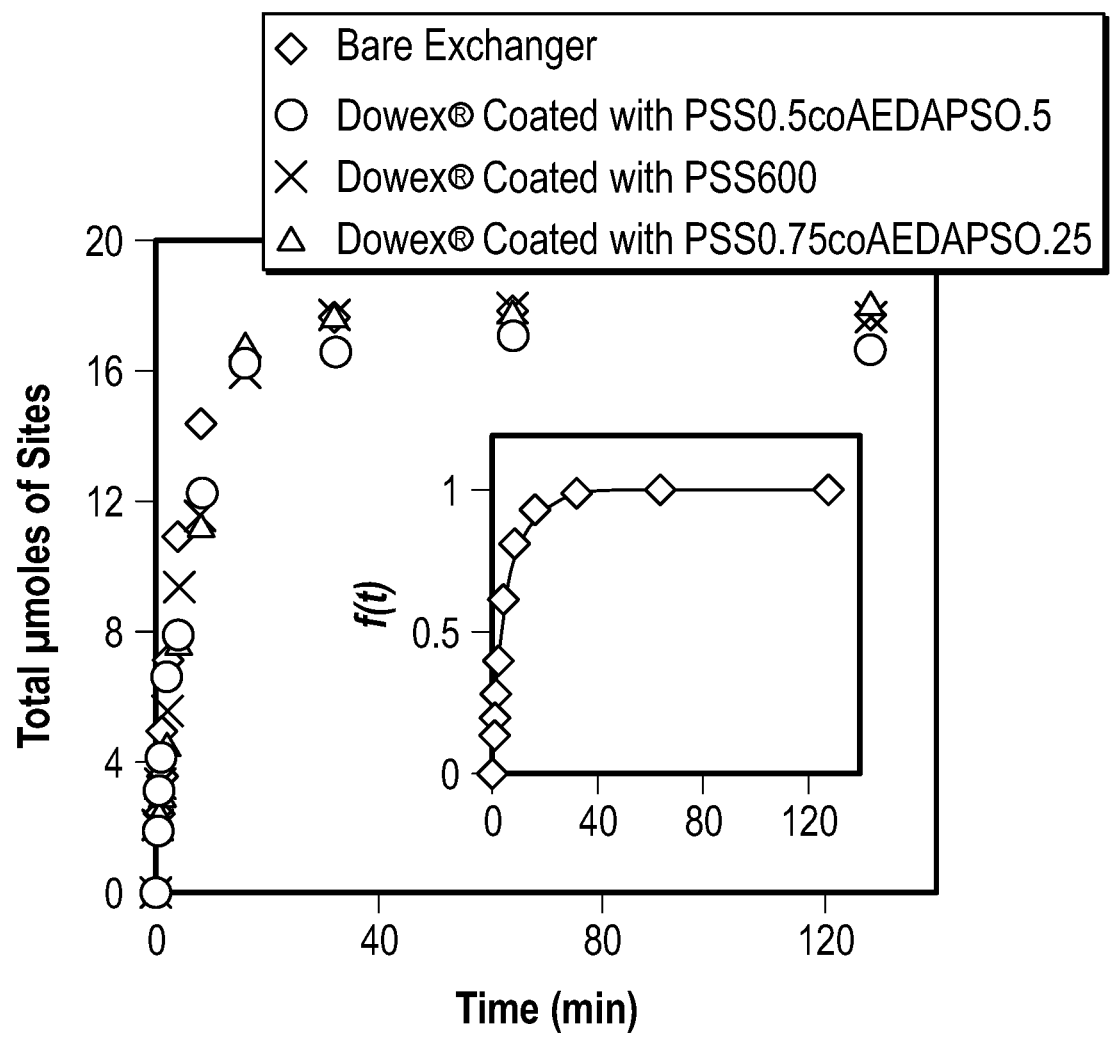
FIG. 7 depicts the sulfate release profile of an embodiment of an ion exchange resin that is uncoated or coated with several embodiments of polyelectrolytes, and (INSET) the fraction of labeled sulfate ions exchanged by unlabeled sulfate from uncoated resin particles versus time.

FIG. 7 depicts the sulfate release profile of uncoated, PSS 600-coated, PSS$_{0.75}$-co-AEDAPS$_{0.25}$-coated and PSS$_{0.5}$-co-AEDAPS$_{0.5}$-coated resin particles, and (INSET) the fraction of labeled sulfate ions exchanged by unlabeled sulfate from uncoated resin particles vs. time.

The beads were then rinsed with deionized water to remove the excess un-exchanged sulfate. Second, the sulfate ions retained in the resins were exchanged with their radioactive isotopes ($^{35}$SO$_4^{2-}$) by immersion in a solution containing an excess of radiolabeled ions. In the third step, the resins were immersed in a solution of unlabeled SO$_4^{2-}$ which resulted in the reverse exchange and release of radioactive sulfate ions back into the solution.

The kinetics of the sulfate self-exchange process were evaluated by measuring the increase of radioactivity in solution as $^{35}$SO$_4^{2-}$ diffused out of the beads. Equations 2 and 3 show the exchange of Cl$^-$ ions occupying two ion exchange resin (IXR) sites by sulfate, then the exchange of unlabeled SO$_4^{2-}$ with radiolabeled $^{35}$SO$_4^{2-}$ followed by self-exchange of $^{35}$SO$_4^{2-}$ from the IXR $$2IXR^+Cl^- + SO_4^{2-} \rightarrow IXR_2^{2+}SO_4^{2-} + 2Cl^- \quad 2$$

$$IXR_2^{2+}SO_4^{2-} + {}^{35}SO_4^{2-} \leftrightarrows IXR_2^{2+35}SO_4^{2-} + SO_4^{2-} \quad 3$$

Uncoated resin samples and particles coated with PSS 600, PSS$_{0.75}$-co-AEDAPS$_{0.25}$ and PSS$_{0.5}$-co-AEDAPS$_{0.5}$ were analyzed. The release profiles (FIG. 8) of all the samples were similar, which confirmed that the diffusion of sulfate was not appreciably altered by the polymer coating.

FIGS. 8A-D depict plots of sulfate self-exchange in (FIG. 8A) DOWEX®, (FIG. 8B) DOWEX®-PSS 600, (FIG. 8C) DOWEX®-PSS$_{0.75}$-co-AEDAPS$_{0.25}$, and (FIG. 8D) DOWEX®-PSS$_{0.5}$-co-AEDAPS$_{0.5}$ vs. time.

The independence of the diffusion rate from the adsorbed polymer layer strongly suggested that the coating did not constitute a barrier for the anions diffusion.

Assuming that the rate-limiting step of the exchange was the diffusion of the ions in the matrix, and that all the resin beads were uniform spheres, the kinetics of the exchange process may be given by the equation described by Boyd, (Boyd, G. E. et al., Journal of the American Chemical Society 1947, 69, 2836-2848):

$$f(t) = 1 - \frac{6}{\pi^2} \sum_{1}^{\infty} \frac{1}{n^2} \exp\left(-\frac{\overline{D}t\pi^2 n^2}{r^2}\right)$$

wherein f is the fractional attainment of equilibrium, $\overline{D}$ is the self-diffusion coefficient within the IER, r is the radius of the resin particles, and n is an integer. The value n was summed from 1 to 30. The sulfate release profiles were converted to the fraction of the resin capacity exchanged shown at FIGS. 8A-D.

The equation was used to fit the experimental data and the diffusion coefficients of sulfate ions from Dowex resin particles were calculated for each system, as depicted in the following table. The diffusion rate of sulfate ions from the beads into the bulk of the solution was found to be slightly lower in the presence of the adsorbed layer.

Specifically, the diffusion coefficient of sulfate through uncoated beads was determined to be $3.20 \times 10^{-8}$ cm$^2 \cdot$s$^{-1}$ compared to $2.24 \times 10^{-8}$ cm$^2 \cdot$s$^{-1}$ for PSS 600-coated beads, $1.90 \times 10^{-8}$ cm$^2 \cdot$s$^{-1}$ for PSS$_{0.75}$-co-AEDAPS$_{0.25}$-coated beads and $2.49 \times 10^{0.8}$ cm$^2 \cdot$s$^{-1}$ for PSS$_{0.5}$-co-AEDAPS$_{0.5}$-coated beads.

| Values of sulfate diffusion coefficients. | | |
|---|---|---|
| Resin coating | Diffusion coefficient (cm$^2$ s$^{-1}$) | Standard deviation |
| No coating | $3.20 \times 10^{-8}$ | $\pm 2.9 \times 10^{-9}$ |
| PSS | $2.24 \times 10^{-8}$ | $\pm 1.8 \times 10^{-9}$ |
| PSS$_{75}$-co-AEDAPS$_{25}$ | $1.90 \times 10^{-8}$ | $\pm 2.9 \times 10^{-9}$ |
| PSS$_{50}$-co-AEDAPS$_{50}$ | $2.49 \times 10^{-8}$ | $\pm 2.7 \times 10^{-9}$ |

Example 12—Demonstration of Antifouling Ability Against Algae

Polymeric coatings were applied onto anion exchange resins to explore the potential of surface charge and zwitterionic functionalities to resist biofouling. The ability of the coatings to deter algal attachment was assessed by investigating the adsorption behavior of algal cells on the anion exchange resins. For this purpose, *Chlamydomonas reinhardtii* algal cells were passed through a 300 mg bed of uncoated resins in increments of 1 mL of $1 \times 10^6$ cells mL$^{-1}$ solution. A total volume of 5 mL was added to the column and collected after passing through the bed. The total number of cells recovered was then counted to evaluate cell attachment. Unmodified resin particles exhibited a significant capability to bind cells as shown at FIG. 9.

Figure 9:
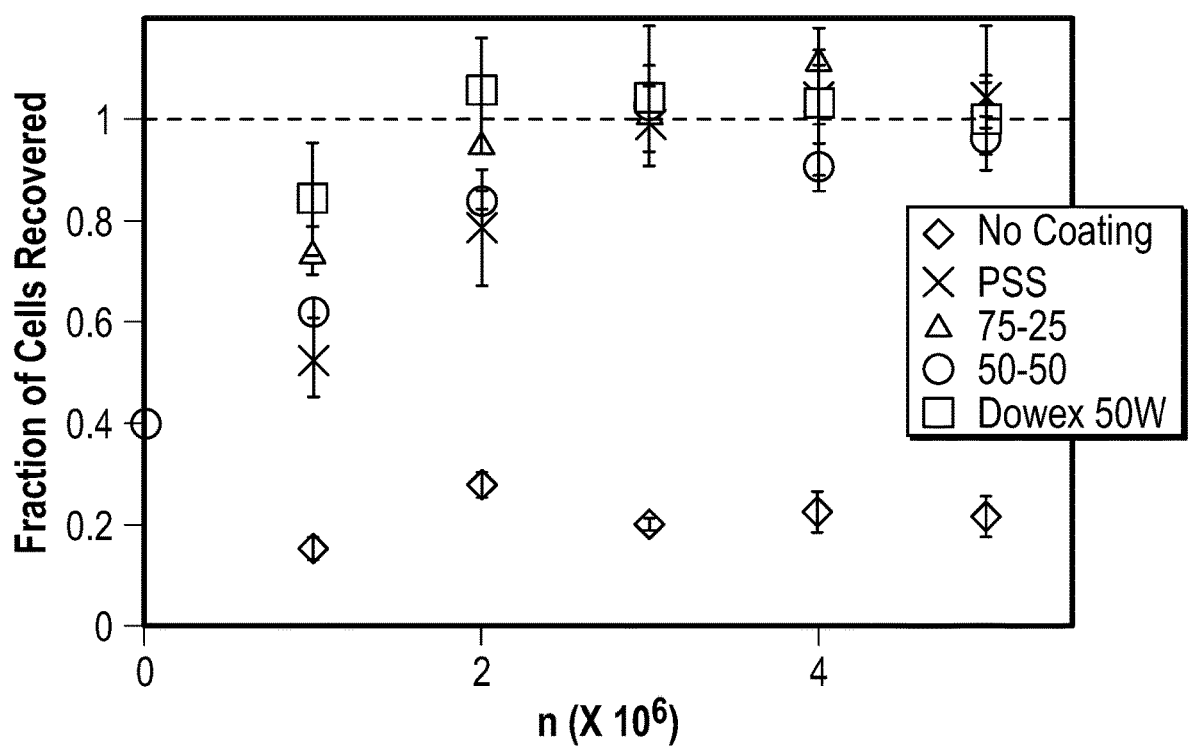
FIG. 9 depicts the fraction of cells recovered as a function of the number of cells added to an embodiment of an ion exchange resin that was uncoated or coated with one of several embodiments of polyelectrolytes.
Figure 10A:
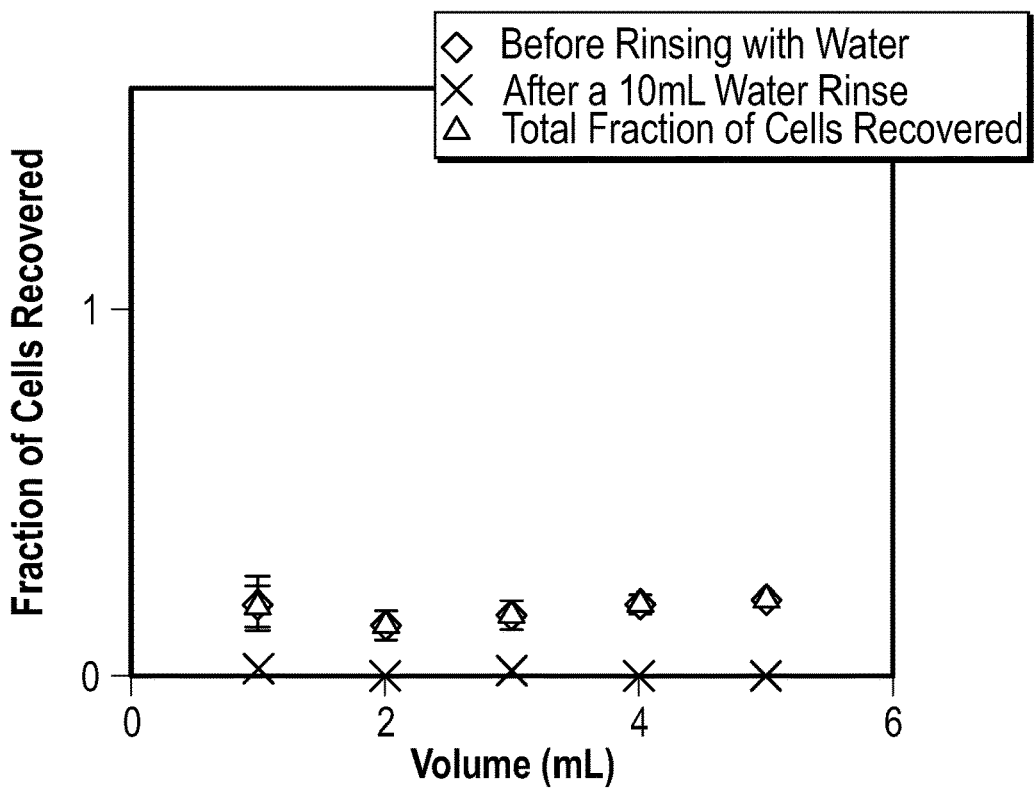
FIG. 10A, FIG. 10B, FIG. 10C, and FIG. 10D depict fractions of cells recovered as a function of a volume of cell suspension contacted with an embodiment of an ion exchange resin that was uncoated (FIG. 10A) or coated (FIG. 10B, FIG. 10C, and FIG. 10D) with one of several embodiments of polyelectrolytes.
Figure 10B:
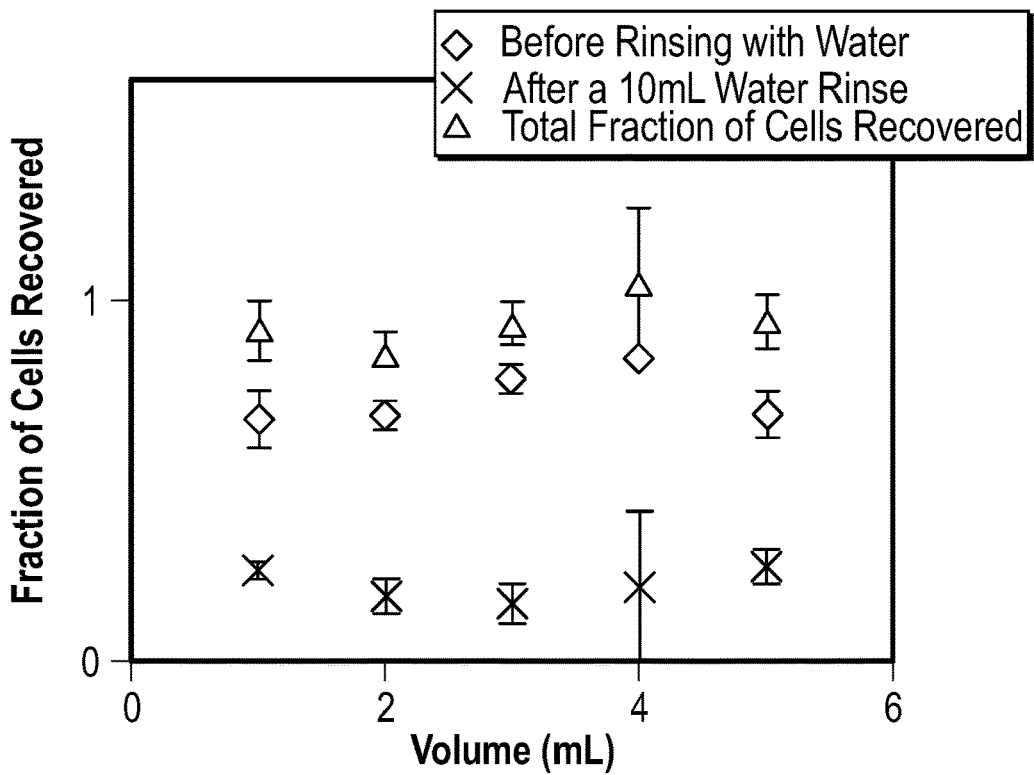
Figure 10C:
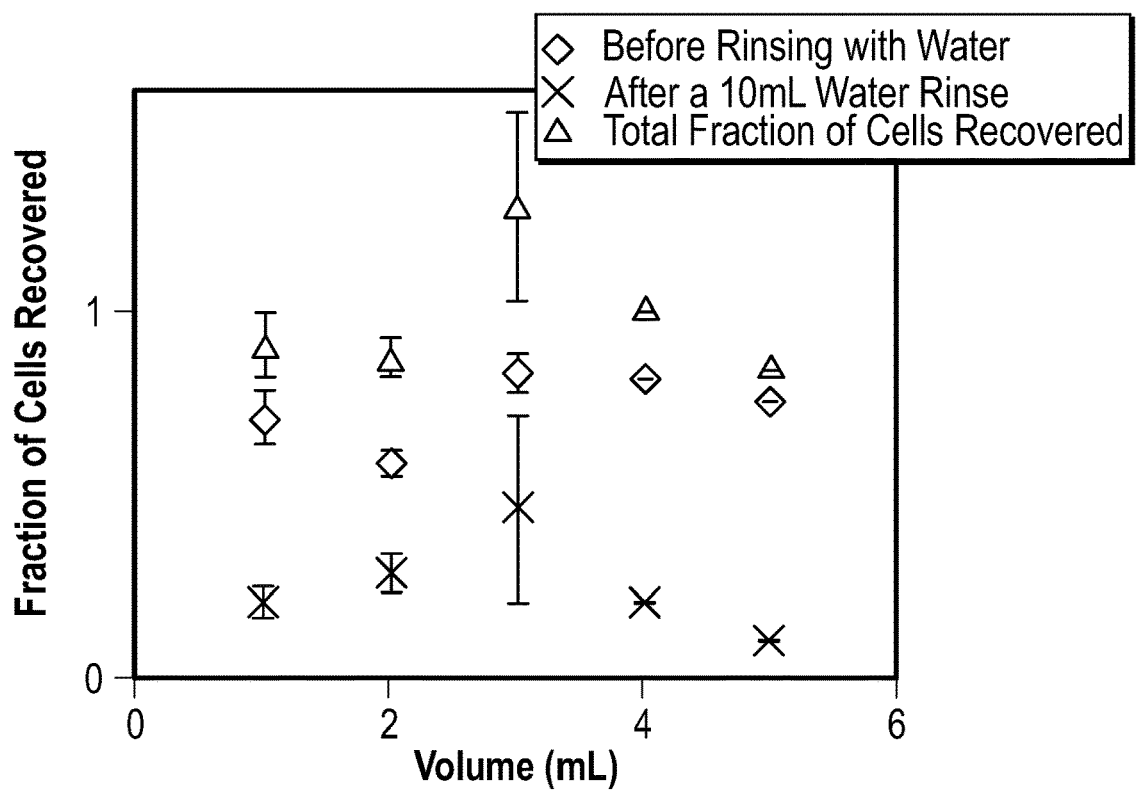
Figure 10D:
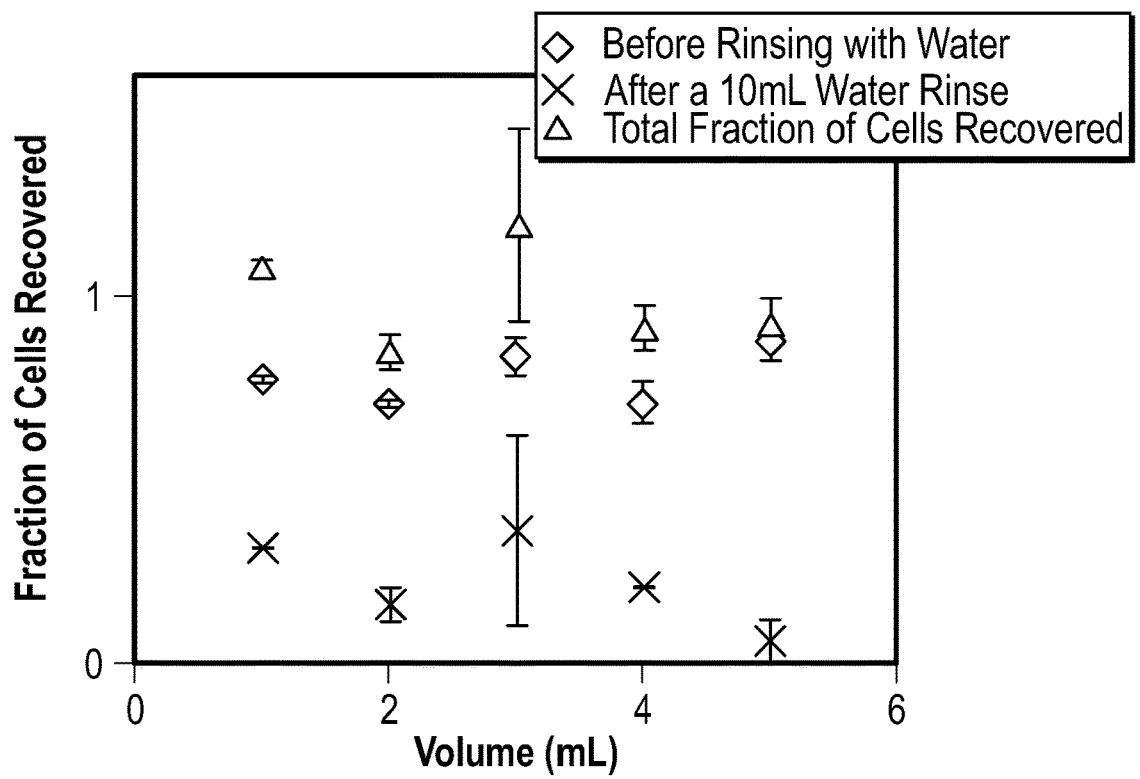

FIG. 9 depicts the fraction of cells recovered as a function of the number of cells added to 300 mg of uncoated, PSS 600-coated, PSS$_{0.75}$-co-AEDAPS$_{0.25}$-coated, PSS$_{0.5}$-co-AEDAPS$_{0.5}$-coated DOWEX® 1×8 and uncoated DOWEX® 50W resin particles. Error bars represent the standard error of the mean.

The beads sequestered 80% of the added algae regardless of the amount of cells passing through the column. However, the settlement of algal cells on the resins was drastically decreased in the presence of all three coatings. Specifically, the fraction of cells recovered after the exposure of $1 \times 10^6$ cells to the PSS 600-coated beads was close to 0.5. This fraction increased to 0.8 when $2 \times 10^6$ cells were added to the bed of resins and reached the maximum recovery value after exposure to $3 \times 10^6$ cells.

The further addition of algae showed no cell attachment to the particles, which provided evidence for the antifouling effect of the coating. A similar behavior was observed for $PSS_{0.75}$-co-$AEDAPS_{0.25}$-coated resins, which sequestered 25% of the algal cells after the addition of $1\times10^6$ cells. Full recovery of algae was attained after $2\times10^6$ or more cells were added to the beads. $PSS_{0.5}$-co-$AEDAPS_{0.5}$ coating also reduced cell adhesion with 60% of cells recovered after the addition of $1\times10^6$ algal cells and 100% recovery when the total number of algal cells exceeded $3\times10^6$ cells.

The possible adhesion of cells onto resin beads upon addition of the first $1-2\times10^6$ cells was further investigated. Experiments were repeated with a rinsing step after each addition of $1\times10^6$ cells. 10 mL of deionized water were added and the total number of cells recovered was counted. The results were plotted, as depicted at FIG. 10A-D, which depict the fraction of cells recovered as a function of the volume of cell suspension (C=$1\times10^6$ cells mL-1) added to (FIG. 10A) DOWEX®, (FIG. 10B) DOWEX®-PSS 600, (FIG. 10C) DOWEX®-$PSS_{0.75}$-co-$AEDAPS_{0.25}$, and (FIG. 10D) DOWEX®-$PSS_{0.5}$-co-$AEDAPS_{0.5}$ beads before rinsing with water, after a 10 mL water rinse, and total fraction of cells recovered.

For uncoated beads, no additional recovery was observed after the beads were washed with an excess of water. In contrast, the addition of water lead to the recovery of all the cells that passed through columns of coated particles. The total fraction of cells recovered after water was added was shown to be close to unity suggesting that the cells were only physically trapped onto the beads.

To evaluate the effect of surface charge on cell adhesion, cation exchange resins DOWEX® 50 W (60-170) were packed in a column and exposed to the same amount of algae cells. FIG. 9 shows that the negatively charged beads exhibited a behavior similar to particles coated with PSS 600 and PSS-co-AEDAPS. This result suggests that the negative surface charge played an important role in repelling algal cells.

The ability of the coatings to resist cell adhesion was then challenged by increasing the load of algae added onto the resin beads by 30-fold. A suspension of $3\times10^7$ cells was passed through the columns containing coated and uncoated particles. The beads were subsequently rinsed with 10 mL of water to remove unbound cells. A green layer of algae progressively expanded throughout the non-coated resin bed as cells attached to the beads surface.

Figure 11:
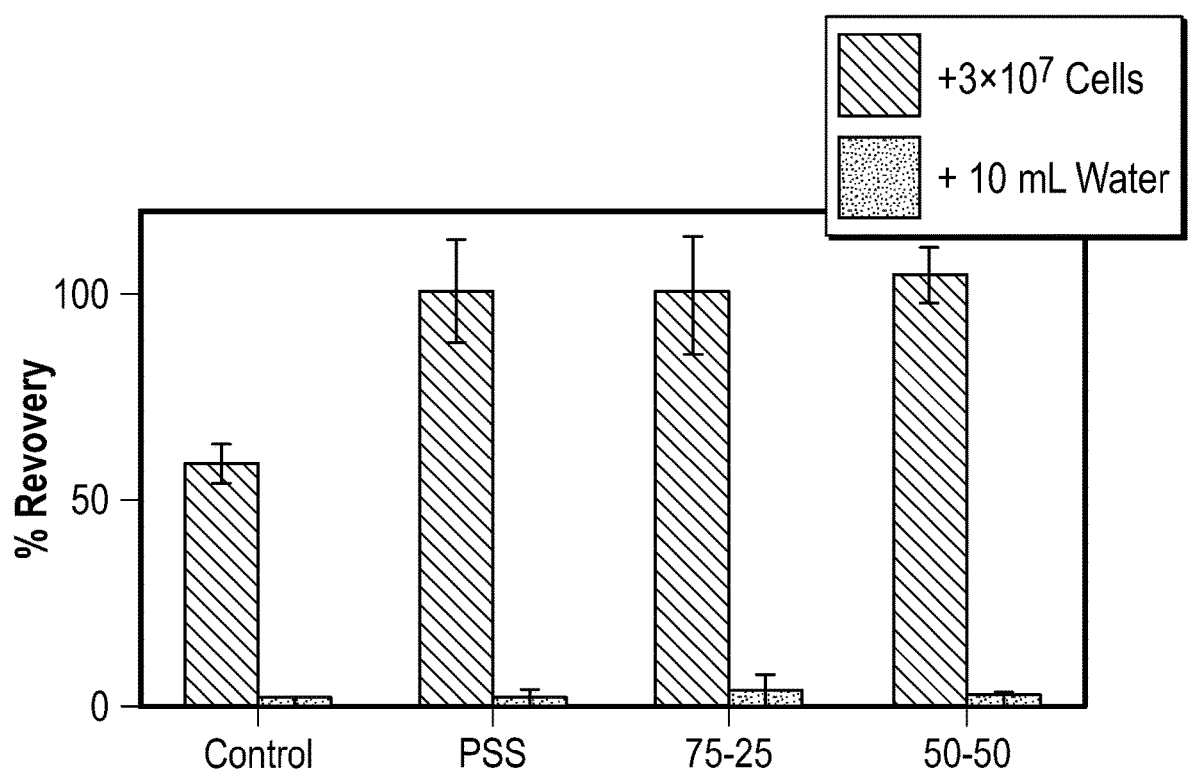
FIG. 11 depicts a plot of the performance of several embodiments of compositions described herein.

In contrast, coated beads remained clear and a green effluent was recovered after the cell suspension was passed through the resin beds. FIG. 11 depicts the percent of cells recovered after $3\times10^7$ *Chlamydomonas reinhardtii* cells (10 m) were passed through resin beds, and shows that 58% of the algae passed through uncoated resins were recovered as opposed to a complete recovery of cells exposed to beads coated with PSS 600, $PSS_{0.75}$-co-$AEDAPS_{0.25}$, and $PSS_{0.5}$-co-$AEDAPS_{0.5}$. Water washes did not result in additional recovery suggesting that algal cells were strongly attached to the surface of non-coated beads.

An SEM micrograph of an uncoated DOWEX® particle after exposure to the algal suspension showed a layer of cell detritus covering the bead surface. SEM images of the coated resins after exposure to algal cells were also collected. A comparison of these micrographs demonstrated that all coatings were effective at preventing algal cell attachment.

The invention claimed is:

1. A composition comprising:
   an ion exchange resin, and
   a polyelectrolyte, wherein the polyelectrolyte is adsorbed to at least a portion of a surface of the ion exchange resin, and the polyelectrolyte has a weight average molecular weight ($M_w$) of at least 100,000 g/mol.

2. The composition of claim 1, wherein the polyelectrolyte comprises a sulfonated repeat unit that is present in the polyelectrolyte at a mole fraction of about 0.5 to about 1.

3. The composition of claim 1, wherein the polyelectrolyte comprises a sulfonated aromatic repeat unit.

4. The composition of claim 1, wherein the polyelectrolyte is selected from the group consisting of [1] poly(styrenesulfonic acid) or a salt thereof, [2] poly(2-acrylamido-2-methyl-1-propane sulfonic acid) or a salt thereof, [3] sulfonated poly(ether ether ketone) or a salt thereof, [4] poly(ethylenesulfonic acid) or a salt thereof, [5] poly(methacryloxyethylsulfonic acid) or a salt thereof, and [6] a copolymer thereof.

5. The composition of claim 1, wherein the polyelectrolyte comprises a charged biomacromolecule.

6. The composition of claim 1, wherein the polyelectrolyte is selected from the group consisting of [1] a polycarboxylate or a salt thereof, [2] a polyphosphate or a salt thereof, [3] a polyphosphonate or a salt thereof, and [4] a combination thereof.

7. The composition of claim 1, wherein the polyelectrolyte comprises one or more zwitterionic repeat units.

8. The composition of claim 7, wherein the zwitterionic repeat unit comprises 3-[2-(acrylamido)-ethyldimethyl ammonio] propane sulfonate.

9. The composition of claim 1, wherein the polyelectrolyte comprises at least one aromatic sulfonated repeat unit and at least one zwitterionic repeat unit.

10. The composition of claim 9, wherein the polyelectrolyte comprises a polymer of the following formula:

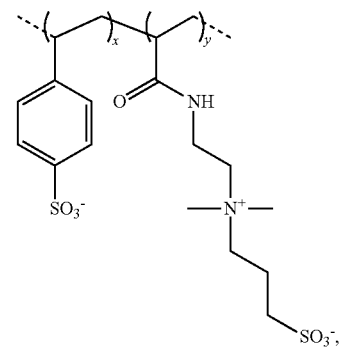

wherein x is a first mole fraction of about 0.5 to about 0.99, and
   y is a second mole fraction of about 0.01 to about 0.5.

11. The composition of claim 1, wherein the polyelectrolyte has a weight average molecular weight of 100,000 g/mole to about 5,000,000 g/mole.

12. The composition of claim 1, wherein the polyelectrolyte has a weight average molecular weight of 100,000 g/mole to about 1,000,000 g/mole.

13. The composition of claim 1, wherein a bulk portion of the ion exchange resin is free of the polyelectrolyte.

14. The composition of claim 1, wherein the ion exchange resin is an anion exchange resin.

15. A method a treating a liquid, the method comprising: contacting the liquid with a composition of claim 1.

16. The method of claim 15, wherein the liquid comprises water.

17. A method of making the composition of claim 1, the method comprising:
   providing a first mixture comprising a polyelectrolyte and a liquid, wherein the polyelectrolyte has a weight average molecular weight ($M_w$) of at least 100,000 g/mol; and
   contacting an ion exchange resin with the first mixture for a time effective to adsorb at least a portion of the polyelectrolyte to at least a portion of a surface of the ion exchange resin to form the composition.

18. The method of claim 17, further comprising crosslinking the at least a portion of the polyelectrolyte that is adsorbed to the at least a portion of the surface of the ion exchange resin.

19. The method of claim 18, wherein the crosslinking comprises (i) contacting the at least a portion of the polyelectrolyte with a crosslinking agent, (ii) heating the composition, (iii) contacting the composition with light for a time effective to photo-crosslink the at least a portion of the polyelectrolyte, or (iv) a combination thereof.

20. The composition of claim 1, wherein the polyelectrolyte further comprises at least one aromatic sulfonated repeat unit and at least one zwitterionic repeat unit, and having the weight average molecular weight of at least 100,000 g/mole to about 1,000,000 g/mole.

\* \* \* \* \*